United States Patent
Yoo et al.

(10) Patent No.: US 10,503,280 B2
(45) Date of Patent: Dec. 10, 2019

(54) DISPLAY DRIVING INTEGRATED CIRCUIT AND ELECTRONIC DEVICE HAVING THE SAME

(71) Applicant: Samsung Electronics Co., Ltd., Suwon-si, Gyeonggi-do (KR)

(72) Inventors: Dae Hyun Yoo, Yongin-si (KR); Louis Hyunsuk Jung, Hwaseong-si (KR); Tae Sung Kim, Seongnam-si (KR); Jong Kon Bae, Seoul (KR); Dong Kyoon Han, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 112 days.

(21) Appl. No.: 15/492,474

(22) Filed: Apr. 20, 2017

(65) Prior Publication Data

US 2017/0308226 A1 Oct. 26, 2017

(30) Foreign Application Priority Data

Apr. 20, 2016 (KR) .................. 10-2016-0048336

(51) Int. Cl.
*G09G 3/36* (2006.01)
*G06F 3/0354* (2013.01)
(Continued)

(52) U.S. Cl.
CPC ........ *G06F 3/03545* (2013.01); *G06F 1/3293* (2013.01); *G06F 3/0488* (2013.01);
(Continued)

(58) Field of Classification Search
CPC ......... G09G 2330/00–021; G09G 2360/04–10
See application file for complete search history.

(56) References Cited

U.S. PATENT DOCUMENTS

| 6,483,510 | B1 | 11/2002 | Jeong |
| 7,698,575 | B2 | 4/2010 | Samson |

(Continued)

FOREIGN PATENT DOCUMENTS

| CN | 1542602 A | 11/2004 |
| CN | 101960485 A | 1/2011 |

(Continued)

OTHER PUBLICATIONS

Chinese Office Action dated Feb. 26, 2019, issued in Chinese Patent Application No. 201710260397.1.

(Continued)

*Primary Examiner* — Sanghyuk Park
(74) *Attorney, Agent, or Firm* — Jefferson IP Law, LLP

(57) ABSTRACT

An electronic device is provided. The electronic device includes a display panel including a plurality of pixels, a first processor configured to execute an application, a first display driving integrated circuit including a second processor and a graphics memory, and a second display driving integrated circuit including a source driver configured to control at least some of the plurality of pixels. The second processor is configured to, when the first processor is in an inactive state with respect to the first display driving integrated circuit, compose or post-process another image to be displayed through the display panel based at least on at least one image stored in the graphics memory, by using the first display driving integrated circuit, and transmit the other image to the second display driving integrated circuit such that the other image is displayed through the display panel.

17 Claims, 17 Drawing Sheets

(51) Int. Cl.
*G06F 3/0488* (2013.01)
*G06F 3/0481* (2013.01)
*G06F 1/3293* (2019.01)
*G09G 3/20* (2006.01)
*G09G 5/00* (2006.01)

(52) U.S. Cl.
CPC ........... *G06F 3/04817* (2013.01); *G09G 3/20* (2013.01); *G09G 5/003* (2013.01); *G06F 2203/04804* (2013.01); *G09G 2310/04* (2013.01); *G09G 2330/021* (2013.01); *G09G 2340/12* (2013.01); *G09G 2340/145* (2013.01)

(56) References Cited

U.S. PATENT DOCUMENTS

| | | | |
|---|---|---|---|
| 7,734,943 | B2 | 6/2010 | Whelan et al. |
| 8,289,333 | B2 | 10/2012 | Schreyer et al. |
| 8,593,467 | B2 | 11/2013 | Schreyer et al. |
| 8,948,823 | B2 | 2/2015 | Choi et al. |
| 9,063,731 | B2 | 6/2015 | Heo et al. |
| 9,250,695 | B2 | 2/2016 | Tse |
| 9,640,100 | B2 | 5/2017 | Connell et al. |
| 9,927,865 | B2 | 3/2018 | Heo et al. |
| 10,042,482 | B2 | 8/2018 | Kim et al. |
| 10,127,849 | B2 | 11/2018 | Connell et al. |
| 10,254,903 | B2 | 4/2019 | Kim et al. |
| 2004/0199798 | A1 | 10/2004 | Whelan et al. |
| 2005/0223249 | A1 | 10/2005 | Samson |
| 2006/0209094 | A1* | 9/2006 | Usuda ................... G06F 3/0485 345/684 |
| 2007/0285428 | A1* | 12/2007 | Foster ....................... G06F 3/14 345/503 |
| 2009/0225089 | A1 | 9/2009 | Schreyer et al. |
| 2010/0110040 | A1 | 5/2010 | Kim et al. |
| 2011/0287753 | A1 | 11/2011 | Choi et al. |
| 2012/0229421 | A1 | 9/2012 | Kim et al. |
| 2013/0033506 | A1 | 2/2013 | Schreyer et al. |
| 2013/0201124 | A1 | 8/2013 | Choi et al. |
| 2014/0059365 | A1 | 2/2014 | Heo et al. |
| 2014/0281607 | A1 | 9/2014 | Tse |
| 2014/0344605 | A1* | 11/2014 | Xie ........................ G06F 1/3293 713/324 |
| 2014/0347285 | A1 | 11/2014 | Lee |
| 2015/0103034 | A1 | 4/2015 | Shepelev et al. |
| 2015/0185811 | A1* | 7/2015 | Connell ...................... G06T 1/60 345/173 |
| 2015/0228048 | A1 | 8/2015 | Heo et al. |
| 2015/0277545 | A1 | 10/2015 | Flowers et al. |
| 2015/0286263 | A1 | 10/2015 | Heo et al. |
| 2016/0027146 | A1 | 1/2016 | Kim et al. |
| 2016/0049106 | A1 | 2/2016 | Connell et al. |
| 2016/0063664 | A1* | 3/2016 | Mizuno ..................... G06T 1/20 345/502 |
| 2016/0188142 | A1* | 6/2016 | Oh ........................ G06F 1/3287 345/174 |
| 2016/0224163 | A1 | 8/2016 | Kim et al. |
| 2016/0224188 | A1 | 8/2016 | Kim et al. |
| 2017/0221451 | A1 | 8/2017 | Connell et al. |
| 2018/0004326 | A1 | 1/2018 | Kim et al. |

FOREIGN PATENT DOCUMENTS

| | | |
|---|---|---|
| CN | 104317462 A | 1/2015 |
| CN | 105280155 A | 1/2016 |
| KR | 10-2011-0126959 A | 11/2011 |
| KR | 10-2013-0091167 A | 8/2013 |
| KR | 10-2014-0027893 A | 3/2014 |
| KR | 10-2014-0137814 A | 12/2014 |
| KR | 10-2015-0029182 A | 3/2015 |

OTHER PUBLICATIONS

European Search Report dated Mar. 4, 2019, issued in European Patent Application No. 17786184.6.

* cited by examiner

DISPLAY DRIVING INTEGRATED CIRCUIT AND ELECTRONIC DEVICE HAVING THE SAME

CROSS-REFERENCE TO RELATED APPLICATION(S)

This application claims the benefit under 35 U.S.C. § 119(a) of a Korean patent application filed on Apr. 20, 2016 in the Korean Intellectual Property Office and assigned Serial number 10-2016-0048336, the entire disclosure of which is hereby incorporated by reference.

TECHNICAL FIELD

The present disclosure relates to an electronic device that outputs a screen through a display driving integrated circuit.

BACKGROUND

Electronic devices such as a smartphone, a tablet personal computer (PC), a smart watch, and the like may output various content, such as a video, an image, a text, and the like, through display panels thereof. A display panel may be driven through a display driving integrated circuit (or a display driver integrated circuit; DDI), and the display driving integrated circuit may receive image data from a processor in an electronic device and may output the received image data through the display panel.

A conventional display driving integrated circuit has performed a simple function of outputting image data from the processor through the display panel and fails to generate a separate image or make use of signals provided from peripheral circuits. This needs to iteratively drive an application processor (AP). In this case, power consumption may increase, and a time to use a battery may decrease.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to combine and output a partial image with a background image provided from an application processor (AP) by installing a separate processor distinguished from the AP in a display driving integrated circuit.

The display driving integrated circuit includes a first display driving integrated circuit that performs an operation associated with outputting the partial image and a second display driving integrated circuit that performs driving of a display pane.

In accordance with an aspect of the present disclosure, an electronic device is provided. The electronic device includes a display panel including a plurality of pixels, a first processor configured to execute an application, a first display driving integrated circuit including a second processor and a graphics memory, and a second display driving integrated circuit including a source driver configured to control at least some of the plurality of pixels. The second processor may be configured to, when the first processor is in an inactive state with respect to the first display driving integrated circuit, compose or post-process another image to be displayed through the display panel based at least on at least one image stored in the graphics memory, by using the first display driving integrated circuit, and transmit the other image to the second display driving integrated circuit such that the other image is displayed through the display panel.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
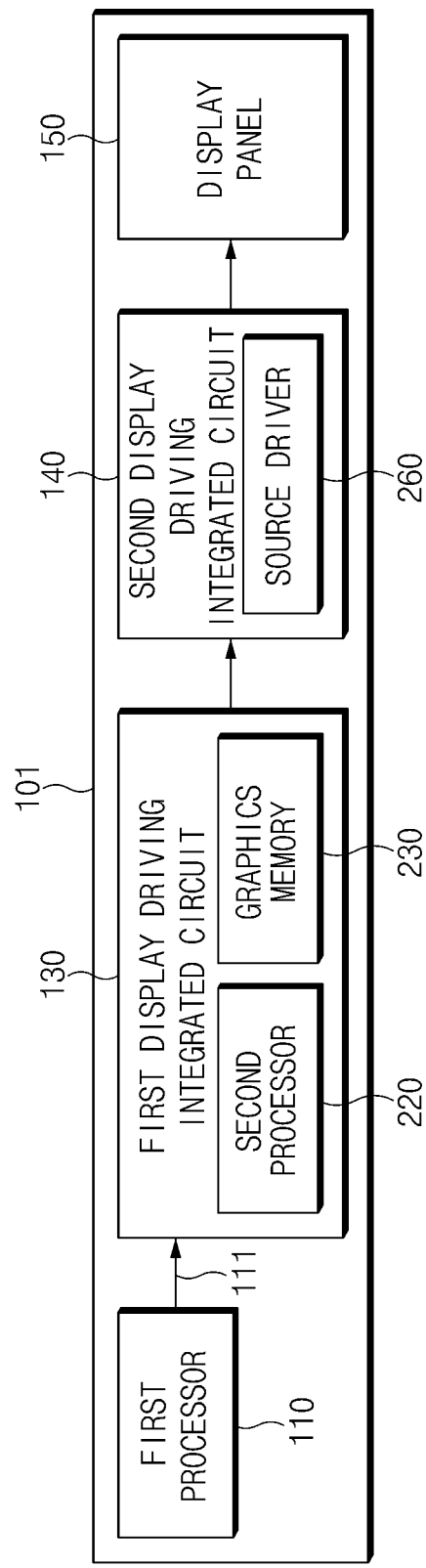
FIG. 1 illustrates a block diagram of an electronic device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modification of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the disclosure disclosed herein, the expressions "have," "may have," "include" and "comprise," or "may include" and "may comprise" used herein indicate existence of corresponding features (for example, elements such as numeric values, functions, operations, or components) but do not exclude presence of additional features.

In the disclosure disclosed herein, the expressions "A or B," "at least one of A or/and B," or "one or more of A or/and B," and the like used herein may include any and all combinations of one or more of the associated listed items. For example, the term "A or B," "at least one of A and B," or "at least one of A or B" may refer to all of the case (1) where at least one A is included, the case (2) where at least one B is included, or the case (3) where both of at least one A and at least one B are included.

The terms, such as "first," "second," and the like used herein may refer to various elements of various embodiments of the present disclosure, but do not limit the elements. For example, such terms are used only to distinguish an element from another element and do not limit the order and/or priority of the elements. For example, a first user device and a second user device may represent different user devices irrespective of sequence or importance. For example, without departing the scope of the present disclosure, a first element may be referred to as a second element, and similarly, a second element may be referred to as a first element.

It will be understood that when an element (for example, a first element) is referred to as being "(operatively or communicatively) coupled with/to" or "connected to" another element (for example, a second element), it can be directly coupled with/to or connected to the other element or an intervening element (for example, a third element) may be present. In contrast, when an element (for example, a first element) is referred to as being "directly coupled with/to" or "directly connected to" another element (for example, a second element), it should be understood that there are no intervening element (for example, a third element).

According to the situation, the expression "configured to" used herein may be used as, for example, the expression "suitable for," "having the capacity to," "designed to," "adapted to," "made to," or "capable of." The term "configured to (or set to)" must not mean only "specifically designed to" in hardware. Instead, the expression "a device configured to" may mean that the device is "capable of" operating together with another device or other components. A central processing unit (CPU), for example, a "processor configured to (or set to) perform A, B, and C" may mean a dedicated processor (for example, an embedded processor) for performing a corresponding operation or a generic-purpose processor (for example, a CPU or an application processor (AP)) which may perform corresponding operations by executing one or more software programs which are stored in a memory device.

Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal detect unless expressly so defined herein in various embodiments of the present disclosure. In some cases, even if terms are terms which are defined in the specification, they may not be interpreted to exclude embodiments of the present disclosure.

An electronic device according to various embodiments of the present disclosure may include at least one of smartphones, tablet personal computers (PCs), mobile phones, video telephones, electronic book readers, desktop PCs, laptop PCs, netbook computers, workstations, servers, personal digital assistants (PDAs), portable multimedia players (PMPs), Moving Picture Experts Group phase 1 or phase 2 (MPEG-1 or MPEG-2) audio layer-3 (MP3) players, mobile medical devices, cameras, and wearable devices. According to various embodiments of the present disclosure, the wearable devices may include accessories (for example, watches, rings, bracelets, ankle bracelets, glasses, contact lenses, or head-mounted devices (HMDs)), cloth-integrated types (for example, electronic clothes), body-attached types (for example, skin pads or tattoos), or implantable types (for example, implantable circuits).

In some embodiments of the present disclosure, the electronic device may be one of home appliances. The home appliances may include, for example, at least one of a digital versatile disc (DVD) player, an audio, a refrigerator, an air conditioner, a cleaner, an oven, a microwave oven, a washing machine, an air cleaner, a set-top box, a home automation control panel, a security control panel, a TV box (for example, Samsung HomeSync™, Apple TV™, or Google TV™), a game console (for example, Xbox™ or Play Station™), an electronic dictionary, an electronic key, a camcorder, or an electronic panel.

In another embodiment of the present disclosure, the electronic device may include at least one of various medical devices (for example, various portable medical measurement devices (a blood glucose meter, a heart rate measuring device, a blood pressure measuring device, and a body temperature measuring device), a magnetic resonance angiography (MRA), a magnetic resonance imaging (MRI) device, a computed tomography (CT) device, a photographing device, and an ultrasonic device), a navigation system, a global navigation satellite system (GNSS), an event data recorder (EDR), a flight data recorder (FDR), a vehicular infotainment device, electronic devices for vessels (for example, a navigation device for vessels and a gyro compass), avionics, a security device, a vehicular head unit, an industrial or home robot, an automatic teller's machine (ATM) of a financial company, a point of sales (POS) of a store, or an internet of things (for example, a bulb, various sensors, an electricity or gas meter, a spring cooler device, a fire alarm device, a thermostat, an electric pole, a toaster, a sporting apparatus, a hot water tank, a heater, and a boiler).

According to some embodiments of the present disclosure, the electronic device may include at least one of a furniture or a unit of a building/structure, an electronic board, an electronic signature receiving device, a projector, or various measurement devices (for example, a water service, electricity, gas, or electric wave measuring device). In various embodiments of the present disclosure, the electronic device may be one or a combination of the aforementioned devices. The electronic device according to some embodiments of the present disclosure may be a flexible electronic device. Further, the electronic device according to an embodiment of the present disclosure is not limited to the aforementioned devices, but may include new electronic devices produced due to the development of technologies.

Hereinafter, electronic devices according to an embodiment of the present disclosure will be described with reference to the accompanying drawings. The term "user" used herein may refer to a person who uses an electronic device or may refer to a device (for example, an artificial electronic device) that uses an electronic device.

FIG. 1 illustrates a block diagram of an electronic device according to an embodiment of the present disclosure.

Referring to FIG. 1, an electronic device 101 may be a device, such as a smartphone, a tablet PC, or the like, or a wearable device, such as a smart watch, a smart band, a virtual reality (VR) device, having a screen output function. The electronic device 101 may include a first processor 110, a first display driving integrated circuit (or a first display driver integrated circuit) 130, a second display driving integrated circuit (or a second display driver integrated circuit) 140, and a display panel 150.

The first processor 110 may perform, for example, data processing or an operation associated with control or communication of at least one other component(s) of the electronic device 101. In various embodiments, the first processor 110 may be a CPU or an AP.

The first processor 110 may transmit image data to be output through the display panel 150 to the first display driving integrated circuit 130 through a first channel 111. An image (hereinafter referred to as a "main image") to be output through the image data may be output through the display panel 150 in units of a frame. For example, in the case of outputting screens at 60 frames per second in the display panel 150, the first processor 110 may transmit image data corresponding to one frame to the first display driving integrated circuit 130 60 times per second. The image data may be stored in at least a part of a graphics memory 230 in the first display driving integrated circuit 130. The first display driving integrated circuit 130 may generate a main image based on the image data stored in the graphics memory 230 and may transmit the main image to the second display driving integrated circuit 140. The second display driving integrated circuit 140 may control the display panel 150 so as to output the main image.

According to various embodiments, in the case where a first frame being currently output is the same as a second frame to be output following the first frame, the first processor 110 may not transmit separate image data to the first display driving integrated circuit 130. In this case, the first processor 110 may be in a sleep state, and the first display driving integrated circuit 130 may continue to output a still video (or a still image) stored in the graphics memory 230.

According to various embodiments, a main image that the first processor 110 provides to the first display driving integrated circuit 130 may be output after being combined with a partial image generated in the first display driving integrated circuit 130. The partial image may be an image of a relatively small capacity, which will be expressed in at least a part of the main image. For example, the partial image may include an image indicating a battery capacity (e.g., 100%, 80%, 50%, and low battery), an image indicating the intensity of wireless communication (e.g., a mobile network type, the intensity of a mobile network or a Wi-Fi signal, and the like), and an image of numbers composing a digital clock/watch.

In various embodiments, the first processor 110 may transmit a control signal for determining selection information or arrangement information (e.g., a location, a size, and the like) of the partial image to a second processor 220 of the first display driving integrated circuit 130. The second processor 220 may select at least one of partial images stored in a part of the graphics memory 230 based on the control signal. The second processor 220 may determine a location, a size, etc. of the selected partial image, may combine the selected partial image with the main image, and may transmit the combined image to the second display driving integrated circuit 140. The second display driving integrated circuit 140 may output an image (hereinafter referred to as a "combination image"), which is obtained by combining the main image and the partial image, through the display panel 150.

In the case where there is a need to change a part of a screen to be output through the display panel 150, the first processor 110 may maintain a specified state (e.g., a sleep state) without transmitting a separate main image to the first display driving integrated circuit 130.

According to various embodiments, the first processor 110 may provide the first display driving integrated circuit 130 with data image-processed by using a specified algorithm. For example, the first processor 110 may compress screen frame data by using a specified algorithm and may transmit the compressed screen frame data to the first display driving integrated circuit 130 at a high speed. The first display driving integrated circuit 130 may decompress compressed data.

The first display driving integrated circuit 130 may combine a main image provided from the first processor 110 and a partial image generated in the first display driving integrated circuit 130 and may transmit the combined image to the second display driving integrated circuit 140.

In various embodiments, the first display driving integrated circuit 130 may include the second processor 220 and the graphics memory 230.

The second processor 220 may select a partial image, which will be output after being combined with a main image, in response to a control signal from the first processor 110. The second processor 220 may determine a way to dispose the selected partial image and may combine the selected partial image with the main image.

For example, in the case where 2:12 is output to the display panel 150 by using a digital clock, the second processor 220 may select "2" of a partial image including "0" to "9" and may dispose "2" at a time portion; the second processor 220 may select "1" and "2" and may sequentially dispose "1" and "2" at a minute portion.

Additional information of the second processor 220 may be provided through FIGS. 2 to 14.

The graphics memory 230 may include a first area (hereinafter referred to as an "image area") storing a main image and a second area (hereinafter referred to as a "resource area") storing a partial area. In various embodiments, the graphics memory 230 may form a direct channel with the first processor 110 and may be provided with a main image. The graphics memory 230 may compress and store data of the main image.

According to various embodiments, the resource area of the graphics memory 230 may be initially set or updated with a partial image provided from the first processor 110. The graphics memory 230 may store a partial image, of which a capacity is relatively small compared with a main image, without separate compression.

The second display driving integrated circuit 140 may be a circuit for outputting an image through the display panel 150. The second display driving integrated circuit 140 may receive data of a combination image, which is obtained by combining a main image and a partial image, from the first display driving integrated circuit 130. The second display driving integrated circuit 140 may drive the display panel 150, based on the received image data. The second display driving integrated circuit 140 may include a source driver 260 for driving the display panel 150.

According to various embodiments, the second display driving integrated circuit 140 may further include a separate image processing module (not illustrated). In the case where data of a combination image received from the first display driving integrated circuit 130 are compressed, the image processing module may decompress the compressed data. The image processing module may additionally perform image processing on data of the combination image.

According to various embodiments, the second display driving integrated circuit 140 may further include an image change module (not illustrated). The image change module may perform image improvement subordinate to the display panel 150. For example, the image change module may include a line buffer used for decoding and a small-scale digital chip.

In various embodiments, the second display driving integrated circuit 140 may be configured such that an analog component needed to drive the display panel 150 is combined with a conventional display driving integrated circuit (DDI) from which at least some of digital components, such as a graphic RAM, an image processing part, and the like, are excluded.

The display panel 150 may output screens such as an image, a text, and the like. The display panel 150 may be, for example, a liquid crystal display (LCD) panel, an organic light-emitting diode (OLED) panel (e.g., an active-matrix OLED (AM-OLED) panel, a passive-matrix OLED panel, or the like), or the like. For example, the display panel 150 may be implemented to be flexible, transparent, or wearable. The display panel 150 may be included in, for example, a case electrically connected with the electronic device 101.

The display panel 150 may receive and output a signal of a main image or a partial image. The display panel 150 may be implemented such that a plurality of data lines and a plurality of gate lines cross each other. At least one pixel may be disposed at an intersection of a data line and a gate line. In the case where the display panel 150 corresponds to an OLED panel, the display panel 150 may include at least one or more switching elements (e.g., a field effect transistor (FET)) and one OLED. Each pixel may produce light based on an image signal received from the second display driving integrated circuit 140 at specified timing.

Figure 2:
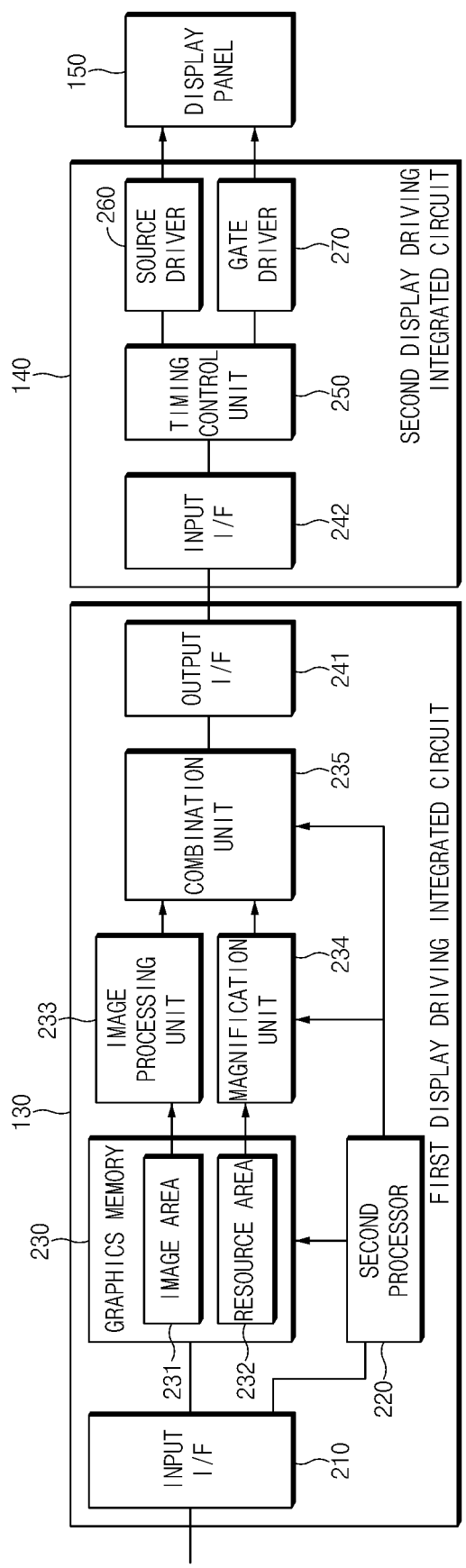
FIG. 2 illustrates a configuration diagram of a first display driving integrated circuit and a second display driving integrated circuit according to an embodiment of the present disclosure.

FIG. 2 illustrates a configuration diagram of a first display driving integrated circuit and a second display driving integrated circuit according to an embodiment of the present disclosure.

Referring to FIG. 2, the first display driving integrated circuit 130 may include an input interface 210, the second processor 220, the graphics memory 230, an image processing unit 233, a magnification unit 234, a combination unit 235, and an output interface 241.

The input interface 210 may receive image data or a control signal from the first processor 110. In various embodiments, the input interface 210 may include a display serial interface (DSI) that connects the first processor 110 and the graphics memory 230 and a serial peripheral interface (SPI) or an inter-integrated circuit (I2C) that connects the first processor 110 and the second processor 220.

The second processor 220 may select a partial image, which will be output after being combined with a main image, in response to a control signal from the first processor 110. The second processor 220 may determine a way to dispose the selected partial image and may combine the selected partial image with the main image.

According to various embodiments, the second processor 220 may randomly access a resource area 232, in which a partial image is stored, of the graphics memory 230 and may extract a partial image that will be output after being combined with a main image.

According to various embodiments, the second processor 220 may include a timer. Even though the second processor 220 fails to receive a separate timing signal from the first processor 110, the second processor 220 may control an output of a partial image based on its own timing signal.

The graphics memory 230 may include an image area 231 and the resource area 232. The image area 231 may be used to store data of a main image provided from the first processor 110. The image area 231 may include a memory space corresponding to a resolution and/or the number of color gradations of the display panel 150. The image area 231 may be referenced as a frame buffer or a line buffer. The resource area 232 may be used to store various types of partial images. The resource area 232 may be a storage area of which a size is smaller than that of the image area 231, and partial images, each of which has a relatively small capacity compared with a main image, without separate compression.

The image processing unit 233 may perform image conversion on image data stored in the resource area 232. Image data stored in the resource area 232 may have the form of data image-processed by a specified algorithm. For rapid transmission, image data may be transmitted to the first processor 110 after being compressed by a specified algorithm. The image processing unit 233 may decompress compressed image. In various embodiments, the image processing unit 233 may improve the quality of image data. Although not illustrated in FIG. 2, the image processing unit 233 may include a pixel data processing circuit, a pre-image processing circuit, a gating circuit, and the like.

The magnification unit 234 may adjust a size of a partial image selected by the second processor 220. One partial image stored in the resource area 232 may be changed into various sizes, and partial images of the various sizes may be respectively disposed in specified areas of a main image.

The combination unit 235 may generate data of a combination image by merging a signal of a main image output from the image processing unit 233 and a partial image of which a size is changed by the magnification unit 234. In various embodiments, the first display driving integrated circuit 130 may further include an image processing module (not illustrated) connected to an output terminal of the combination unit 235. The image processing module may perform image improvement on the combination image.

According to various embodiments, the combination image may be stored in the graphics memory 230. The combination image may replace a main image stored in the graphics memory 230 or may be stored separately from the main image. A combination image stored in the graphics memory 230 may be used after being additionally combined with a partial image.

The output interface 241 may transmit data of a combination image generated by the combination unit 235 to the second display driving integrated circuit 140. For example, the output interface 241 may transmit data of a red, green, and blue (RGB) manner or a pentile manner (e.g., a red, green, blue and green (RGBG) or red, green, blue and white (RGBW) manner) to the second display driving integrated circuit based on a characteristic of a display panel.

The second display driving integrated circuit 140 may be a circuit for outputting a combination image transmitted from the first display driving integrated circuit 130 through the display panel 150. The second display driving integrated circuit 140 may include an input interface 242, a timing control unit 250, the source driver 260, and a gate driver 270.

The input interface 242 may form a channel with the output interface 241 of the first display driving integrated circuit 130 and may receive data of a combination image.

The timing control unit 250 may generate a source control signal for controlling an operation timing of the source driver 260 and a gate control signal for controlling an operation timing of the gate driver 270.

The source driver 260 and the gate driver 270 may generate signals to be supplied to a scan line and a data line of the display panel 150, based on the source control signal and the gate control signal received from the timing control unit 250, respectively.

Figure 3:
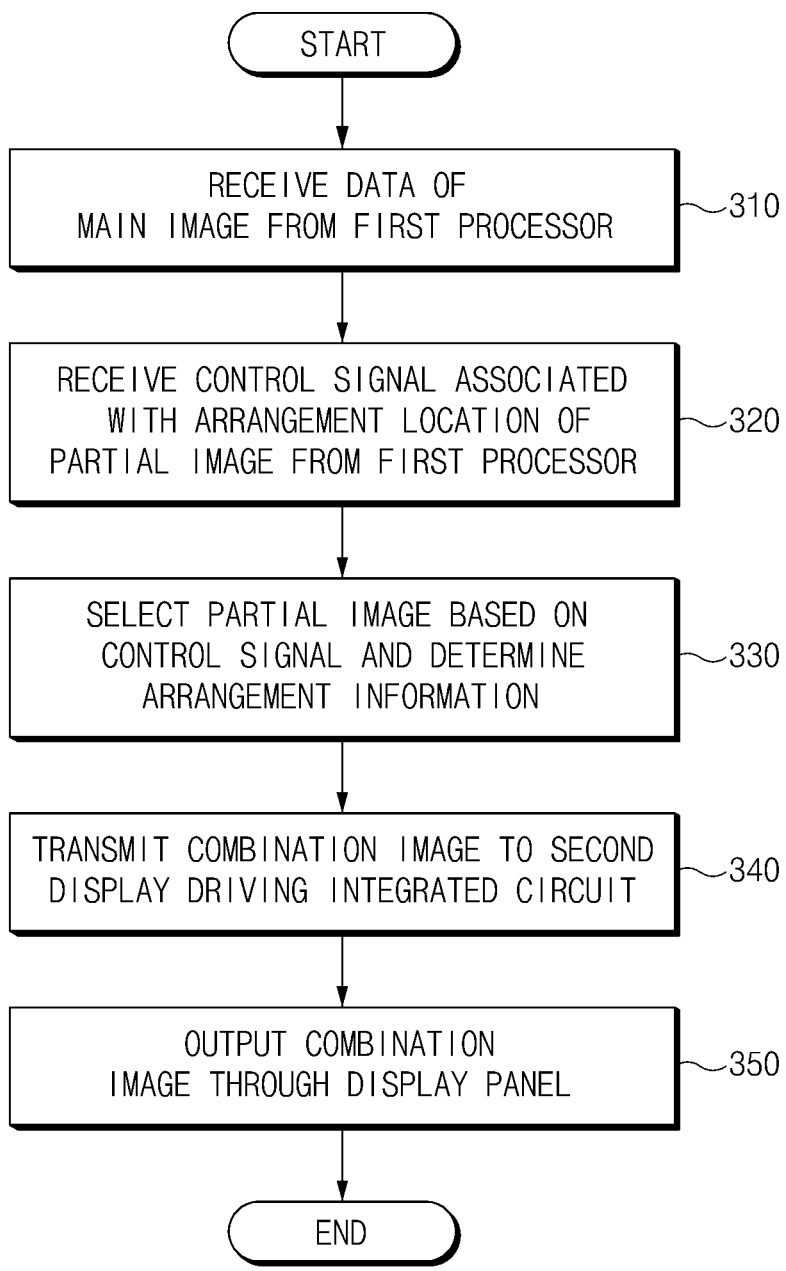
FIG. 3 is a flowchart illustrating an image output method according to an embodiment of the present disclosure.

FIG. 3 is a flowchart illustrating an image output method according to an embodiment of the present disclosure.

Referring to FIG. 3, in operation 310, the first processor 110 may transmit data of a main image to the graphics memory 230 of the first display driving integrated circuit 130. The graphics memory 230 may store data of the main image in the image area 231. The main image may be an image including information (e.g., a missed call, reception of a message, and the like) processed by the first processor 110. In various embodiments, the first processor 110 may perform initial setting or update on the image area 231 of the graphics memory 230 as well as the resources area 232.

In operation 320, the second processor 220 of the first display driving integrated circuit 130 may receive a control signal for determining selection information or arrangement information (e.g., a location, a size, and the like) of a partial image from the first processor 110.

In operation 330, based on the control signal, the second processor 220 may select a partial image in the resource area 232 of the graphics memory 230 and may determine arrangement information. For example, the second processor 220 may select one of partial images, each of which indicates the intensity of a Wi-Fi signal (e.g., maximum intensity/middle intensity/weak intensity), based on information about the intensity of a wireless Wi-Fi signal, which is transmitted from the first processor 110. The second processor 220 may determine a location (e.g., coordinate information), at which the partial image indicating the intensity of the Wi-Fi signal will be displayed, based on the control signal. The second processor 220 may verify a size of the partial image indicating the intensity of the Wi-Fi signal based on the control signal and may adjust the size based on the verification result.

In operation 340, the second processor 220 may transmit a combination image, which is obtained by combining the selected partial image and a main image stored in the image area 231 of the graphics memory 230, to the second display driving integrated circuit 140.

In operation 350, the second display driving integrated circuit 140 may output the combination image through the display panel 150.

Figure 4:
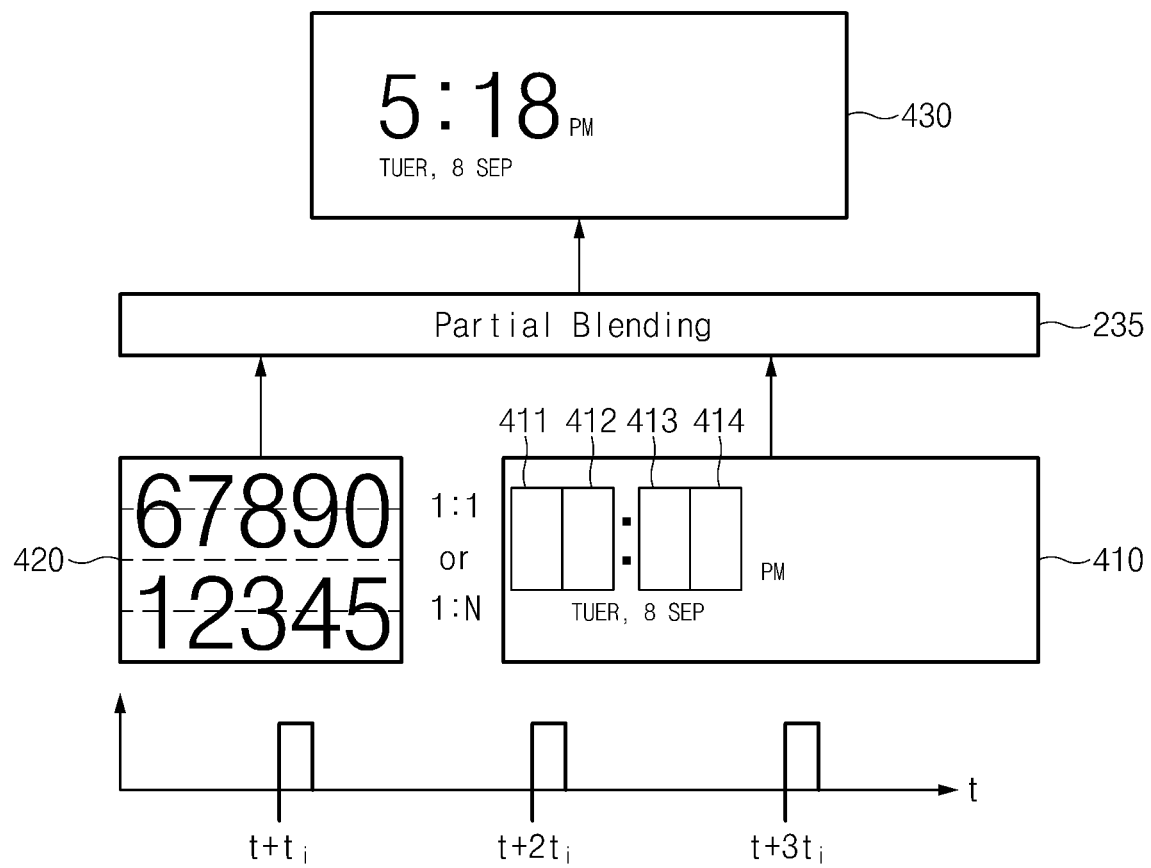
FIG. 4 is an exemplification diagram of a screen that outputs a digital clock using a partial image according to an embodiment of the present disclosure.

FIG. 4 is an exemplification diagram of a screen that outputs a digital clock using a partial image according to an embodiment of the present disclosure.

Referring to FIG. 4, the first display driving integrated circuit 130 may receive a main image 410 from the first processor 110. The main image 410 may be stored in the image area 231 of the graphics memory 230. In various embodiments, the main image 410 may be an image compressed according to a specified algorithm and may be decompressed and output through the image processing unit 233.

The main image 410 may include change areas 411, 412, 413, and 414 and in at least some thereof partial images are included. In FIG. 4, hour/minute areas of a digital clock are illustrated as the change areas 411 to 414. However, the scope and spirit of the present disclosure may not be limited thereto. For example, a status bar, an application (e.g., a call app, a camera app, or the like) execution button, and the like may correspond to change areas.

The main image 410 may include a fixed area as well as the change areas 411 to 414. For example, the fixed area may include a colon between an hour and a minute, an area in which am/pm, date, and the like are displayed, a background image area, and the like. The fixed area may be changed in the case where data of a new main image are transmitted from the first processor 110.

The second processor 220 may receive arrangement information of a partial image 420 from the first processor 110 as a control signal. The arrangement information may include information about coordinates of a start point, a width/height, and the like of the partial image 420. The second processor 220 may output at least one image of the partial image 420 to the change areas 411 to 414, based on the arrangement information.

According to various embodiments, the arrangement information may include information about a start point/width/height of a partial image or may include information about start point coordinates/end point coordinates of the partial image.

The second processor 220 may include a timer for generating a timing signal. The second processor 220 may generate an interrupt at a specified time period $t_i$ (e.g., 1 minute) to update partial images to be input to the change areas 411 to 414 based on arrangement information.

For example, the second processor 220 may generate an interrupt at a time of $(t+t_i)$ such that a separate partial image is not output to the change area 411. In this case, the second processor 220 may select numbers "5", "1", and "8" and may output the selected numbers "5", "1", and "8" to the change area 412, the change area 413, and the change area 414, respectively. The second processor 220 may generate an interrupt at a time of (t+2$t_i$) such that previous states of the change areas 411 to 413 are maintained without change. In this case, the second processor 220 may select a number "9" and may output the selected number "9" to the change area 414. The second processor 220 may generate an interrupt at a time of (t+3$t_i$) such that previous states of the change areas 411 and 412 are maintained without change. In this case, the second processor 220 may select numbers "2" and "0" and may output the selected numbers "2" and "0" to the change areas 413 and 414, respectively.

A combination image 430 output through the display panel 150 may include a digital clock in which the hour/minute area is changed through a partial image. In this case, the hour/minute area may be changed through a partial image generated in the first display driving integrated circuit 130. In the case where the hour/minute area is changed, the first processor 110 may continue to output a previously stored still image without needing to transmit a separate main image to the first display driving integrated circuit 130. As such, since an operation of the first processor 110 decreases, power consumption may be reduced.

Figure 5:
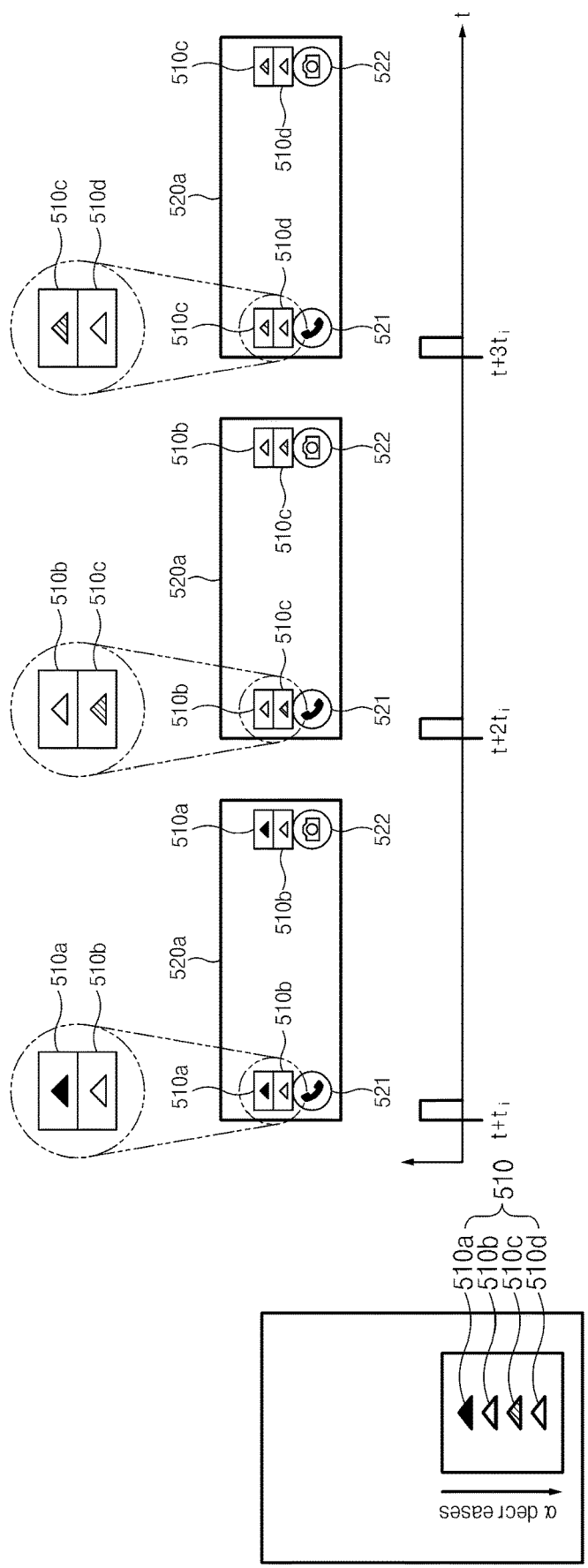
FIG. 5 is an exemplification diagram of a screen that generates an animation effect using a partial image according to an embodiment of the present disclosure.

FIG. 5 is an exemplification diagram of a screen that generates an animation effect using a partial image according to an embodiment of the present disclosure.

Referring to FIG. 5, the second processor 220 may output an animation effect through a change (e.g., adjustment of transparency, brightness, size, and the like) of a simple form with respect to one partial image. For example, in the case where a partial image 510 is included in the resource area 232 of the graphics memory 230, the second processor 220 may change and output the transparency of the partial image 510 to be output based on a specified time. As such, the second processor 220 may allow a user to know an execution manner of a button 521 or 522 to be output on a screen 520*a*.

For example, the second processor 220 may output a partial image 510*a* of transparency of 0% at a time of (t+$t_i$), may output a partial image 510*b* of transparency of 10% at a time of (t+2$t_i$), may output a partial image 510*c* of transparency of 50% at a time of (t+3$t_i$), and may output a partial image 510*d* of transparency of 100% at a time of (t+4$t_i$).

In various embodiments, the second processor 220 may be set such that an output location is changed together with transparency. For example, at a time of (t+$t_i$), the second processor 220 may output the partial image 510*b* of the transparency of 10% at a first location, which corresponds to a location on/over the button 521 or 522 and may output the partial image 510*a* of the transparency of 0% on the top of the first location. At a time of (t+2$t_i$), the second processor 220 may output the partial image 510*c* of the transparency of 50% at the first location and may output the partial image 510*b* of the transparency of 10% at a second location.

The user may verify a transparency or location change of a partial image and may execute a relevant application by swiping the button 521 or 522 in a vertical direction.

The first processor 110 may not transmit separate main image data in the process of giving an animation effect of a simple form by using a partial image. In this case, the animation effect may be executed by an operation of the first display driving integrated circuit 130.

Figure 6:
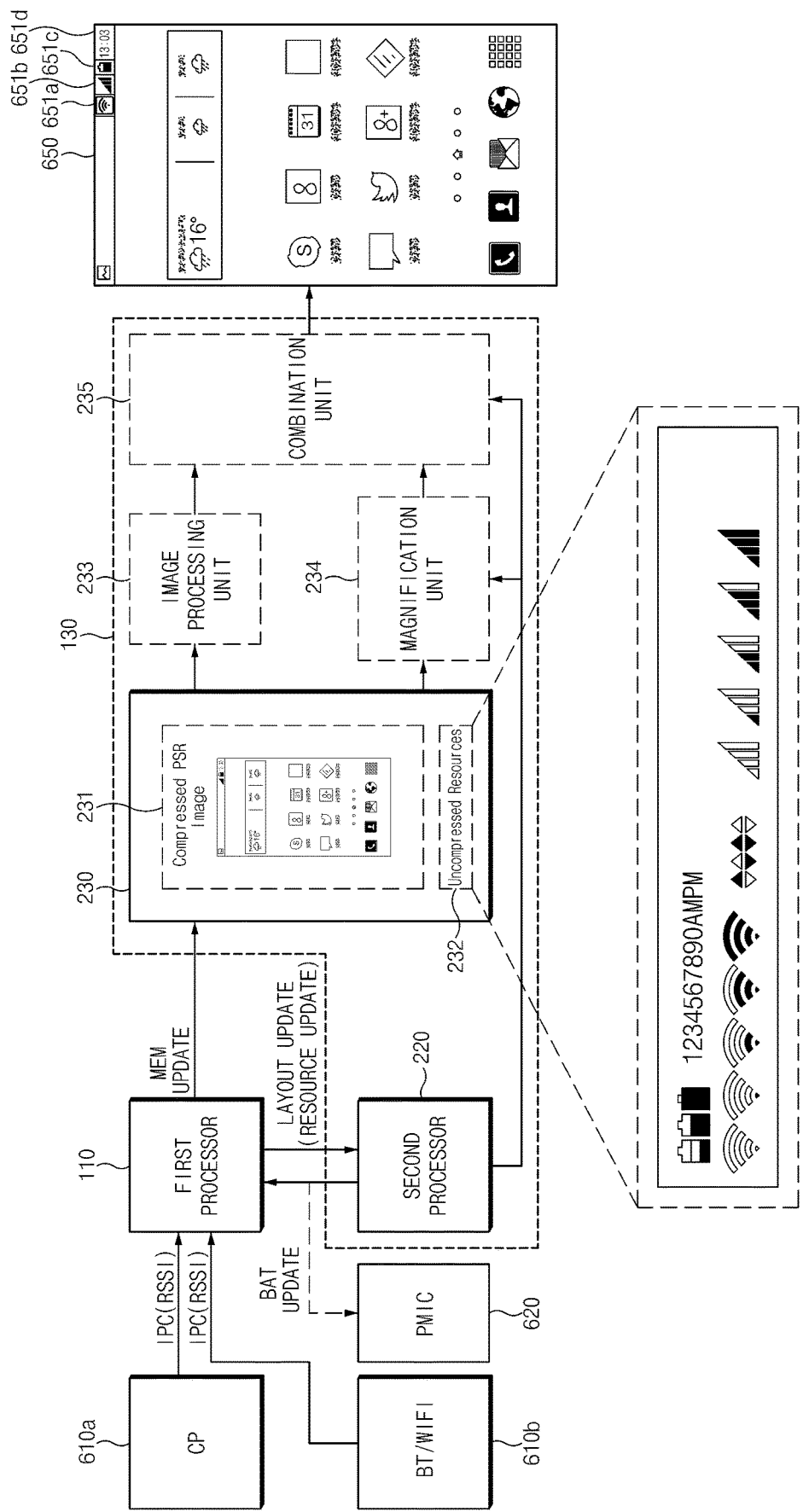
FIG. 6 is an exemplification diagram of a screen that indicates a change of a status bar using a partial image according to an embodiment of the present disclosure.

FIG. 6 is an exemplification diagram of a screen that indicates a change of a status bar using a partial image according to an embodiment of the present disclosure. FIG. 6 illustrates the case where a wireless communication status, a battery status, and a digital clock of items of a status bar are changed by using a partial image. However, embodiments of the present disclosure may not be limited thereto.

Referring to FIG. 6, in the case where an icon or text (e.g., a wireless communication status, a battery level, a digital clock, or the like) that needs to be periodically changed exist, the second processor 220 may output the icon or text by changing or replacing a partial image. In this case, an icon of the status bar may be changed without changing a separate main image through the first processor 110. The first processor 110 may maintain a specified state (e.g., a sleep state) and may reduce power consumption due to transmission of a main image.

1) In the case where an icon (or image) of a wireless communication status (e.g., Wi-Fi communication, wireless data communication using a base station, or the like) is changed, the first processor 110 may receive wireless communication information (e.g., received signal strength indicator (RSSI)) from a communication module (e.g., a communication processor (CP) 610*a* or a Bluetooth (BT)/WI-FI 610*b*). The first processor 110 may transmit a control signal to the second processor 220 based on the received wireless communication information.

The second processor 220 may select some of wireless communication-related partial images (e.g., Wi-Fi signal intensity, wireless data In/Out, wireless data signal intensity, and the like) stored in the resource area 232 of the graphics memory 230. The second processor 220 may change a size of a partial image, of which a size is selected to be enough to be included in the status bar disposed on an upper end of a main image, by using the magnification unit 234. The second processor 220 may decompress data of a main image stored in the image area 231, may combine the decompressed result with a partial image of which a size is adjusted, and may transmit the combined result to the second display driving integrated circuit 140.

The second display driving integrated circuit 140 may output a combination image 650. A Wi-Fi image 651*a* may be disposed at a first location of a status bar of the combination image 650, and a wireless data communication image 651*b* may be disposed at a second location thereof.

According to various embodiments, the second processor 220 may generate an interrupt at a time interval (e.g., one second) specified by an internal timer to update the Wi-Fi image 651*a* or the wireless data communication image 651*b*.

2) In the case of a change of a battery icon (or image), the second processor 220 may receive updated information of a power status directly from a power management integrated circuit (PMIC) 620 or may receive updated information of a power status through the first processor 110. The second processor 220 may select one of battery icons (e.g., 100%, 50%, 30%, and below 15%) stored in the resource area 232 based on the received information of the power status. The second processor 220 may change a battery icon, of which a size is selected to be enough to be included in the status bar disposed on an upper end of a main image, by using the magnification unit 234.

The second display driving integrated circuit 140 may output the combination image 650. A battery icon 651*c* may be disposed at a third location of the status bar of the combination image 650. The second processor 220 may generate an interrupt at a time interval (e.g., one minute) specified by the internal timer to update the battery icon 651*c*.

3) A digital clock displayed in the status bar may be output in a manner that is the same as or similar to a manner of outputting a digital clock in FIG. 4. In this case, the second processor 220 may adjust and output sizes of numbers composing hour/minute with a size enough to be included in the status bar, by using the magnification unit 234. A digital clock 651d may be disposed at a fourth location of the status bar of the combination image 650. The second processor 220 may generate an interrupt at a time interval (e.g., one minute) specified by the internal timer to update the digital clock 651d.

Figure 7:
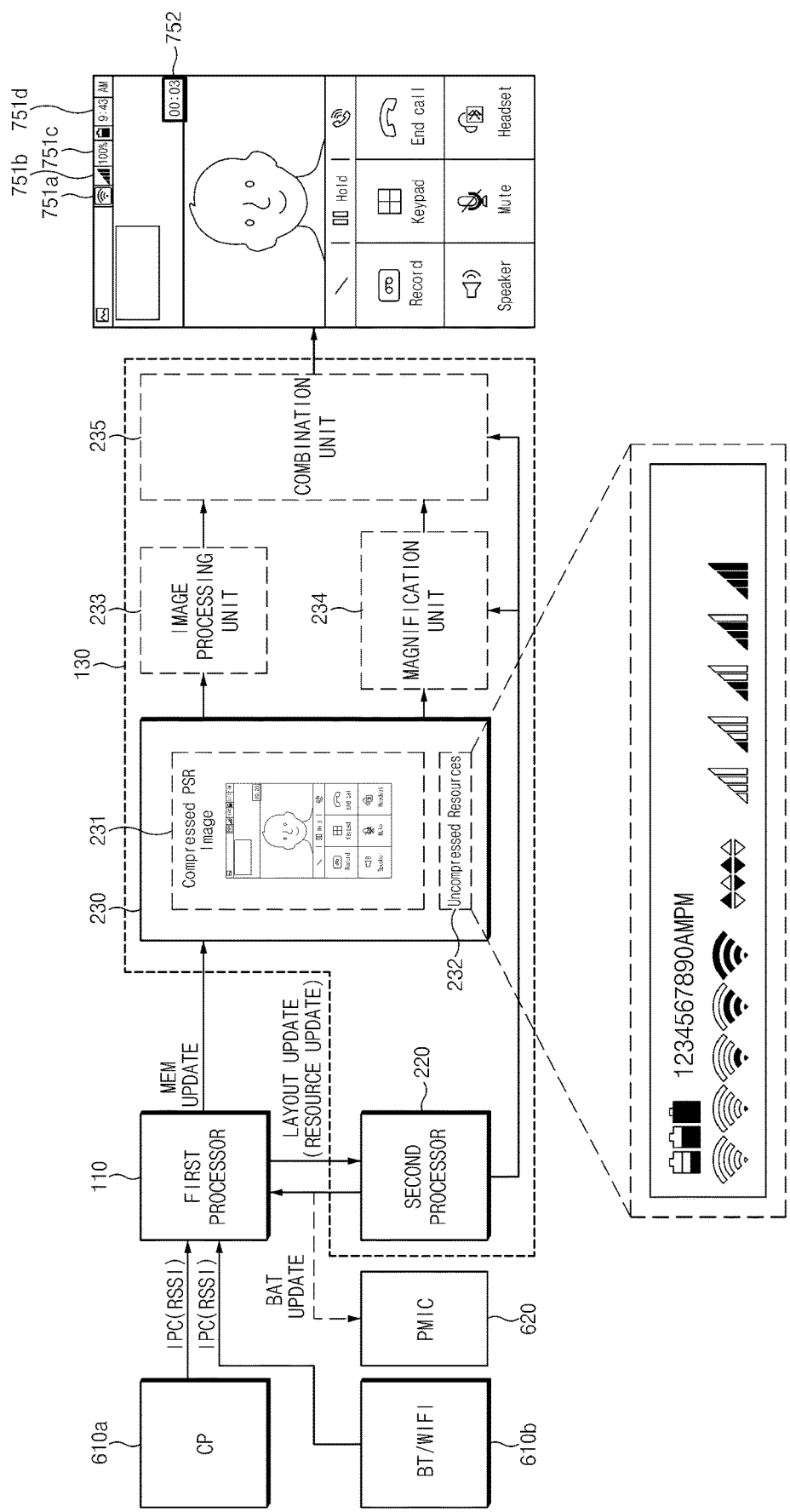
FIG. 7 is an exemplification diagram of a screen that indicates a change of a call screen using a partial image according to an embodiment of the present disclosure.

FIG. 7 is an exemplification diagram of a screen that indicates a change of a call screen using a partial image according to an embodiment of the present disclosure. The case where a call time is updated is exemplified in FIG. 7. However, embodiments of the present disclosure may not be limited thereto.

Referring to FIG. 7, the second processor 220 may output a status bar icon (e.g., a wireless communication status, a battery level, a digital clock, or the like) changed during a voice call, a call connection time, and the like by a change or replacement of a partial image. The first processor 110 may not transmit separate image data after transmitting a main image (e.g., a call connection screen) to the first display driving integrated circuit 130 once.

Icons 751a, 751b, 751c, and 751d of a status bar may be changed to be the same as or similar to a status bar changing manner of FIG. 6. The second processor 220 may change the icons 751a to 751d of the status bar by changing partial images in response to an internal timing signal.

The second processor 220 may change an area 752 for displaying a call connection time through a partial image. The second processor 220 may generate an interrupt at a time interval (e.g., one second) specified by an internal timer to update the area 752 for displaying a call connection time. For example, if a call connection starts, the second processor 220 may select a number "0" from the resource area 232, may adjust a size of the selected number "0", and display "00:00". After one second, the second processor 220 may select numbers "0" and "1" from the resource area 232, may adjust sizes of the selected numbers "0" and "1", and display "00:01."

Figure 8:
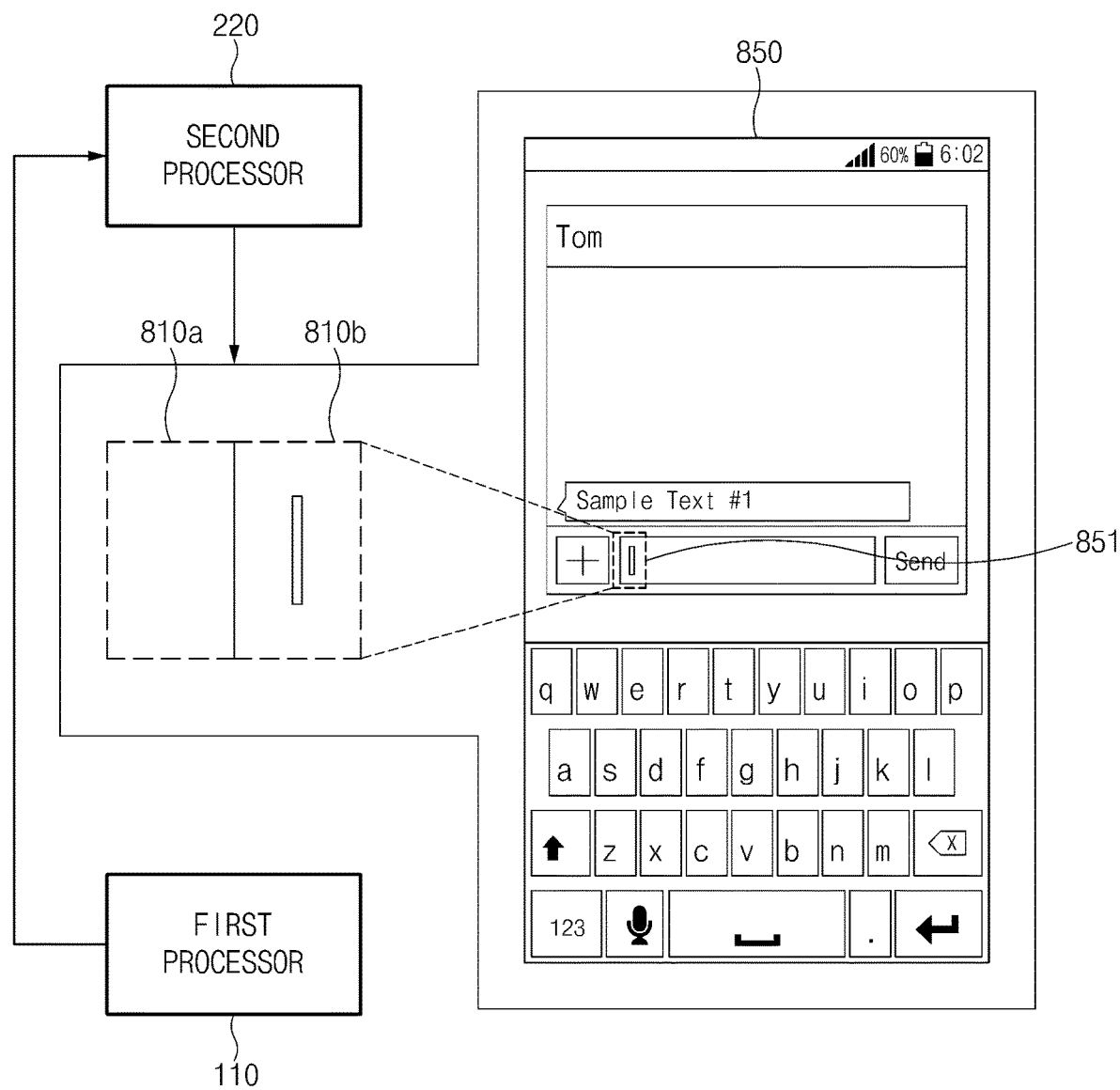
FIG. 8 is an exemplification diagram of a screen that outputs a cursor using a partial image according to an embodiment of the present disclosure.

FIG. 8 is an exemplification diagram of a screen that outputs a cursor using a partial image according to an embodiment of the present disclosure.

Referring to FIG. 8, the first processor 110 may transmit a main image 850 (e.g., a message input screen, a memo input screen, or the like) including a cursor area 851 to the first display driving integrated circuit 130. The main image may be stored in the image area 231 of the graphics memory 230. The second processor 220 may output a cursor blinking operation in the cursor area 851 by changing or replacing a partial image.

The resource area 232 of the graphics memory 230 may store a first cursor image 810a and a second cursor image 810b. The second processor 220 may implement the cursor blinking operation by alternately outputting the first cursor image 810a and the second cursor image 810b in the cursor area 851 at a time interval (e.g., 0.5 seconds) specified by an internal timer.

In a state where no separate input of the user occurs, a stored still video (or a still image) stored in the image area 231 of the graphics memory 230 may continue to be output, and the cursor blinking operation may be processed through the second processor 220 of the first display driving integrated circuit 130. Afterwards, in the case where the user inputs a separate text, the first processor 110 may transmit an updated main image to the first display driving integrated circuit 130.

Figure 9:
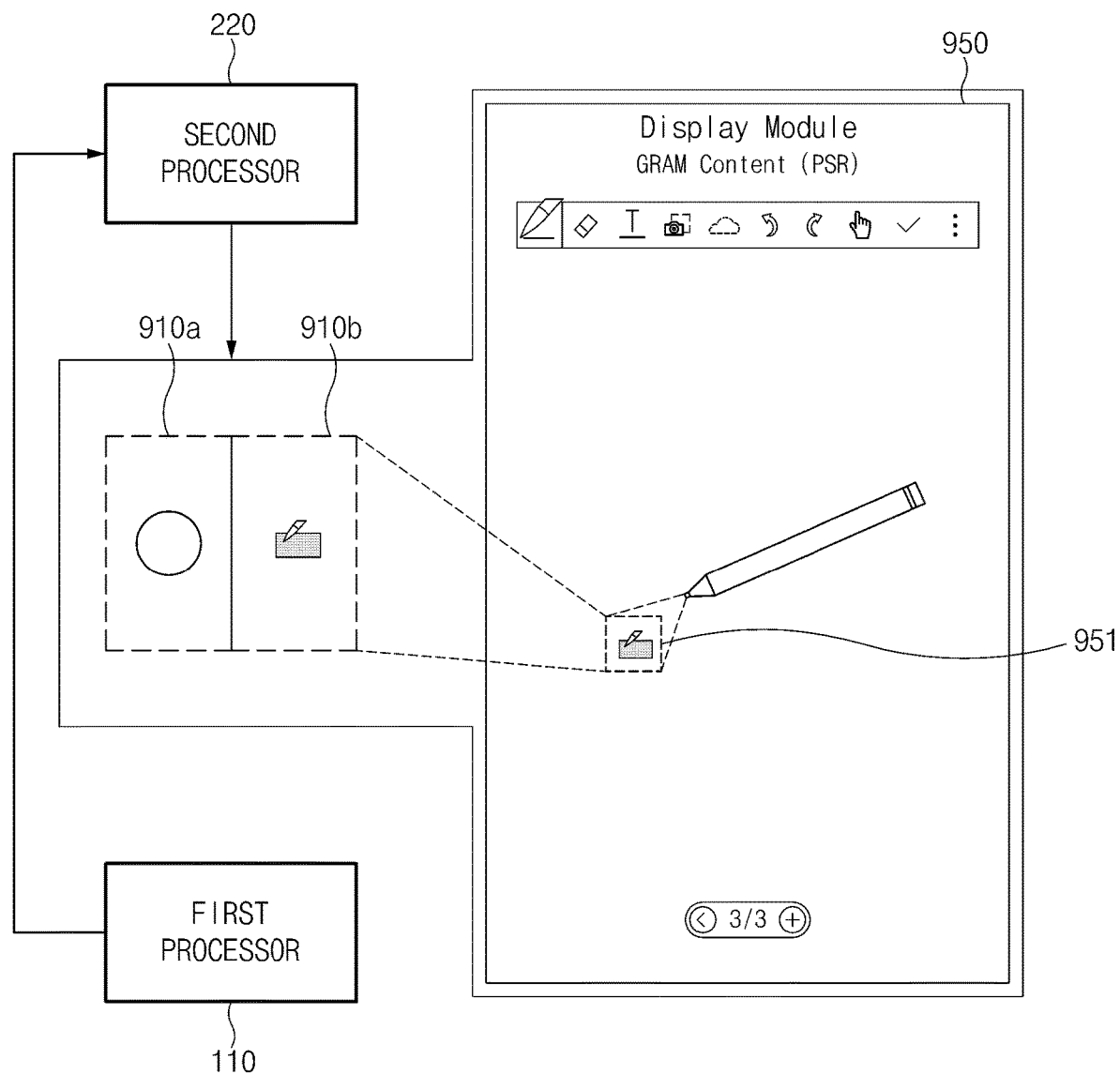
FIG. 9 is an exemplification diagram of a screen that indicates an image output using an operation of a touch pen according to an embodiment of the present disclosure.

FIG. 9 is an exemplification diagram of a screen that indicates an image output using an operation of a touch pen according to an embodiment of the present disclosure. A touch input of a touch pen or a hovering input is exemplified in FIG. 9. However, embodiments of the present disclosure may not be limited thereto.

Referring to FIG. 9, the first processor 110 may transmit a main image 950 (e.g., a memo input screen using a touch pen or the like) including a pen display area 951 to the first display driving integrated circuit 130. The main image may be stored in the image area 231 of the graphics memory 230. The second processor 220 may output an operation in which the pen display area 951 moves, by changing or replacing a partial image. In various embodiments, the second processor 220 may receive updated information of a location of a touch pen directly from a touch pen control circuit (e.g., a Wacom IC or the like).

The resource area 232 of the graphics memory 230 may store a first pen image 910a and a second pen image 910b. For example, the first pen image 910a may be an image indicating the case where the user disposes a touch pen to be adjacent to a display panel, and the second pen image 910b may be an image indicating the case where the user selects a drawing function to record a memo.

The second processor 220 may receive coordinates of the touch pen at a specified time interval (e.g., 0.1 second) from the touch pen control circuit (e.g., a Wacom IC). The second processor 220 may output the first pen image 910a or the second pen image 910b at the received coordinates.

The second processor 220 is illustrated in FIG. 9 as establishing a separate channel with the touch pen control circuit. However, embodiments of the present disclosure may not be limited thereto. For example, the second processor 220 may establish a channel with a peripheral communication circuit, touch circuit, or sensor circuit (e.g., a CP, a touch control circuit, a sensor hub, a global positioning system (GPS) control module, and the like). The second processor 220 may sense occurrence of a specified event received through the channel and may generate a partial image based on the event.

For example, the sensor hub may measure brightness information of a periphery of the electronic device 101 through an illumination sensor or an image sensor. The second processor 220 may establish a channel with a sensor hub and may receive the brightness information through the channel. The second processor 220 may change brightness of a display panel according to a specified internal timing signal based on the brightness information.

For another example, during a call connection, the sensor hub may determine whether the user approaches the electronic device 101 within a specified distance, through a proximity sensor. The second processor 220 may establish a channel with the sensor hub and may receive approach information of the user through the channel. In the case where it is determined that the user approaches the electronic device 101, the second processor 220 may turn off the display panel 150, thereby preventing an unnecessary touch error. In contrast, in the case where the user becomes away from the electronic device 101, the second processor 220 may turn on the display panel 150 to allow the user to verify contents of a screen.

Figure 10:
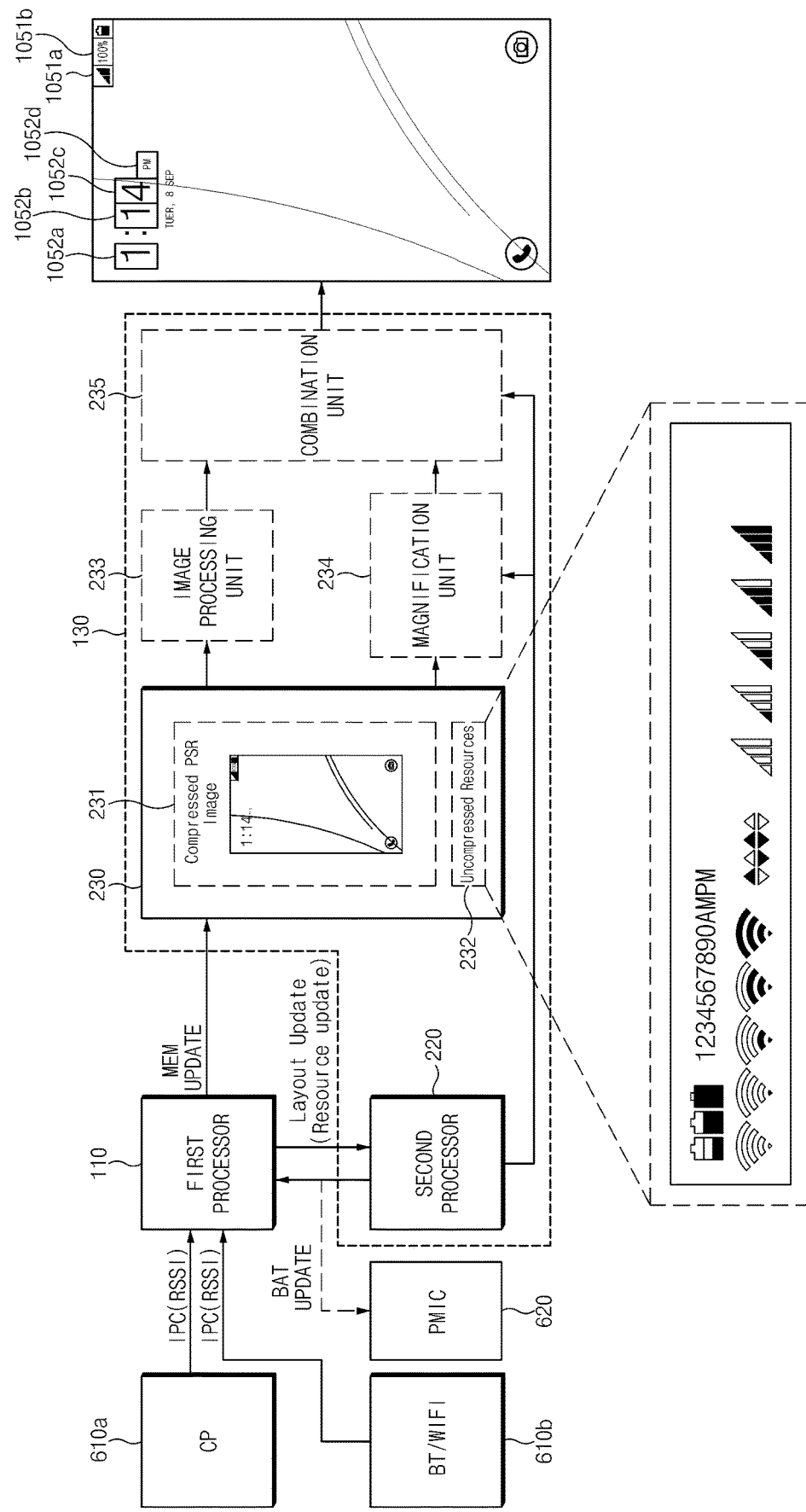
FIG. 10 is an exemplification diagram of a screen illustrating a lock screen output according to an embodiment of the present disclosure.

FIG. 10 is an exemplification diagram of a screen illustrating a lock screen output according to an embodiment of the present disclosure.

Referring to FIG. 10, the first processor 110 may transmit a background image of a lock screen to the first display driving integrated circuit 130. The background image may be compressed and stored in the image area 231 of the graphics memory 230.

The second processor 220 may output an image area (e.g., an icon of a status bar, a digital clock, or the like) varying in the lock screen by changing or replacing a partial image.

Icons 1051a and 1051b of a status bar may be changed to be the same as or similar to a status bar changing manner of FIG. 6. The second processor 220 may change the icons 1051a and 1051b of the status bar by changing a partial image(s) in response to an internal timing signal.

Digital clock components 1052a, 1052b, 1052c, and 1052d may be output in a manner that is the same as or similar to a manner of outputting a digital clock in FIG. 4. In this case, the second processor 220 may adjust and output sizes of numbers composing hour/minute with a size enough to be included in a digital clock area, by using the magnification unit 234. The second processor 220 may generate an interrupt at a time interval (e.g., one minute) specified by the internal timer to update the digital clock components 1052a to 1052d.

In a screen lock state, the first processor 110 may maintain a sleep state or a low-power state after transmitting a background image. In contrast, the second processor 220 of the first display driving integrated circuit 130 may perform an operation for outputting a change of a lock screen. For example, the first processor 110 may enter a sleep state after transmitting a background image including an image (e.g., a date (day/month/year), an app execution button, or the like), which changes or does not change at a relatively long time interval, to the first display driving integrated circuit 130. The second processor 220 of the first display driving integrated circuit 130 may update a wireless communication status icon, a battery icon, a digital clock, and the like, which change in a screen lock state, based on a signal according to an internal timer.

Figure 11:
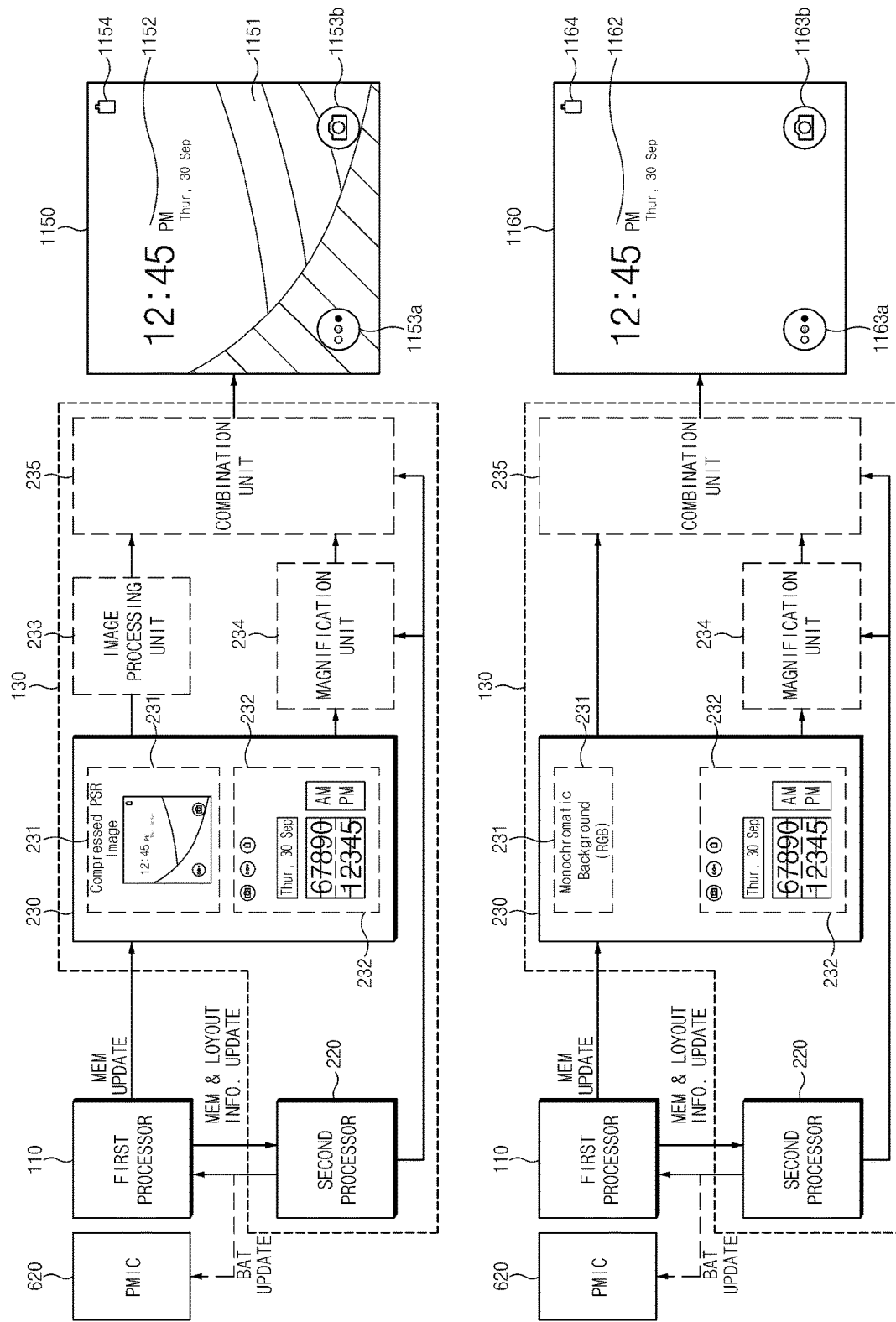
FIG. 11 is an exemplification diagram of a screen that outputs a view cover image according to an embodiment of the present disclosure.

FIG. 11 is an exemplification diagram of a screen that outputs a view cover image according to an embodiment of the present disclosure.

Referring to FIG. 11, the second processor 220 may output an image area (e.g., an icon of a status bar, a digital clock, a touch button, or the like) varying in a view cover image of a smartphone, a tablet PC, or the like by changing or replacing a partial image. A view cover image 1150 or 1160 may be an image output in only a specified partial area of the whole display panel 150. The view cover image 1150 or 1160 may be smaller than the screen lock image of FIG. 10 and may provide a more simplified user interface.

1) Output of View Cover Image 1150 (in the Case of Including Background Image)

The first processor 110 may transmit a main image being a background image to the first display driving integrated circuit 130. A background image 1151 may be stored in the image area 231 of the graphics memory 230 in a compressed form.

The second processor 220 may output a digital clock 1152, touch button icons 1153a and 1153b, a battery icon 1154, and the like through changing or replacing of a partial image.

The second processor 220 may decompress data of the compressed background image 1151 through the image processing unit 233 or may adjust a size to correspond to a size of a view cover. The second processor 220 may combine the decompressed background image 1151 with numbers/characters constituting the digital clock 1152, the touch button icons 1153a and 1153b, the battery icon 1154, and the like. The combined image may be output through the second display driving integrated circuit 140.

2) Output of View Cover Image 1160 (in the Case of not Including Background Image or in the Case of being Output with a Default Setting Value).

The second processor 220 may output the view cover image 1160 in a state where there is no background image (e.g., a black screen) or in a state where a specified monochromatic screen (e.g., an RGB screen), based on settings, without receiving a separate background image from the first processor 110.

The second processor 220 may combine a default setting screen (e.g., a monochromatic screen) with numbers/characters constituting a digital clock 1162, touch button icons 1163a and 1163b, a battery icon 1164, and the like. The combined image may be output through the second display driving integrated circuit 140. In this case, the second processor 220 may not perform decompressing or image processing on a background image through the image processing unit 233. A speed at which the view cover image 1160 is output may be faster than a speed at which the view cover image 1150 is output.

Figure 12:
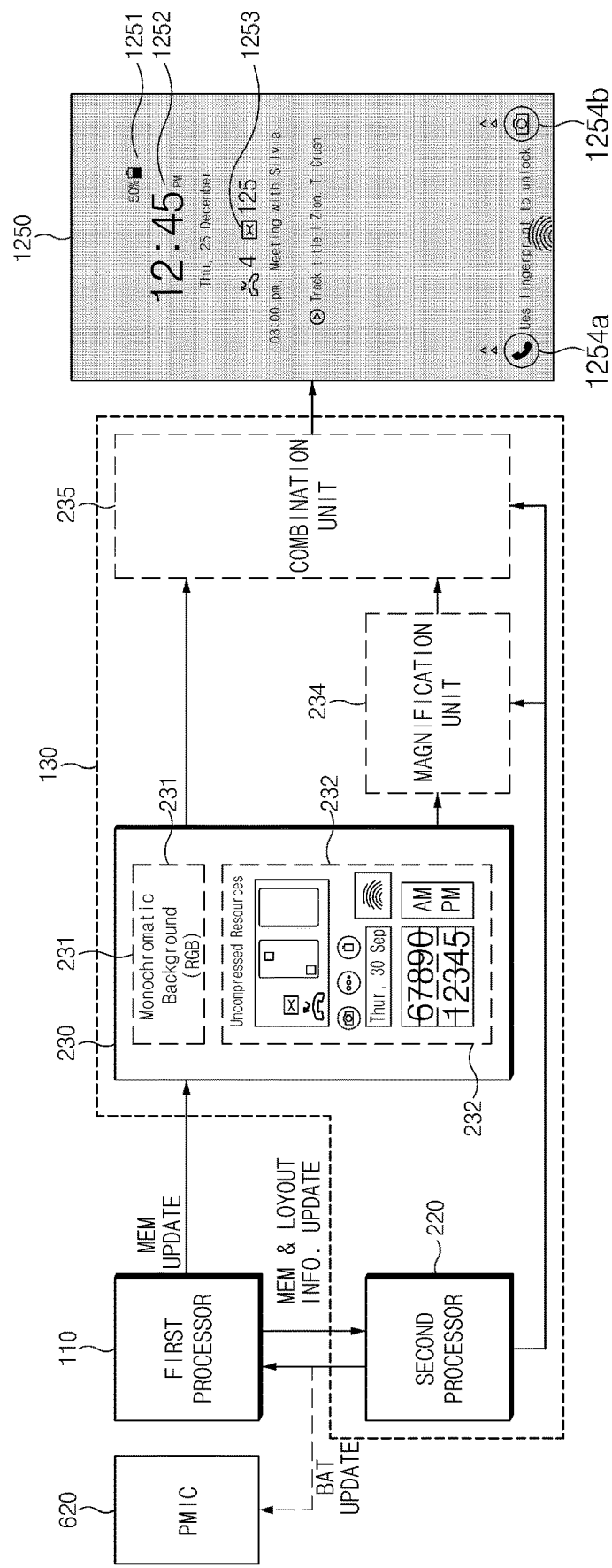
FIG. 12 is an exemplification diagram of a low-power lock screen according to an embodiment of the present disclosure.

FIG. 12 is an exemplification diagram of a low-power lock screen according to an embodiment of the present disclosure. Unlike the lock screen of FIG. 10, a lock screen of FIG. 12 may be output with a monochromatic screen without a background image.

Referring to FIG. 12, the first processor 110 may not transmit a background image of a separate lock screen to the first display driving integrated circuit 130. A monochromatic screen (e.g., a monochromatic screen in which RGB is combined) may be stored in the image area 231 of the graphics memory 230.

The second processor 220 may output an image area (e.g., a battery icon, a digital clock, a touch button, a fingerprint recognition notification, or the like) varying in a lock screen 1250 by changing or replacing a partial image.

The second processor 220 may combine a default setting screen (e.g., a monochromatic screen in which RGB is combined) with numbers/characters constituting a battery icon 1251, a digital clock 1252, a message reception icon 1253, touch button icons 1254a and 1254b, and the like. The combined image may be output through the second display driving integrated circuit 140. In this case, the second processor 220 may output the lock screen 1250 to be more rapid than a lock screen including a background image as in FIG. 10, without performing a decompressing process or an image processing process through the image processing unit 233.

Figure 13:
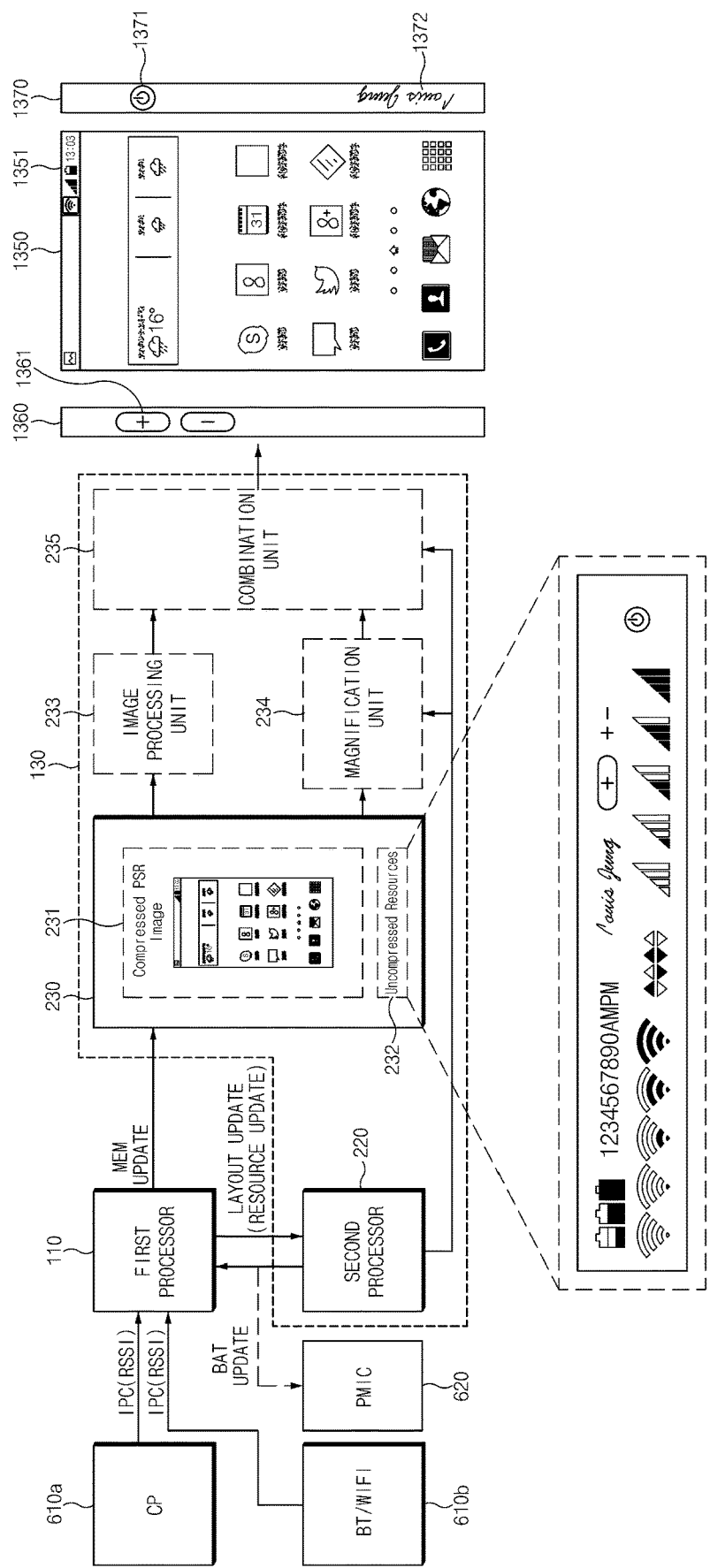
FIG. 13 is an exemplification diagram of a screen that outputs a virtual button according to an embodiment of the present disclosure.

FIG. 13 is an exemplification diagram of a screen that outputs a virtual side button according to an embodiment of present disclosure. In FIG. 13, an embodiment is exemplified as a virtual button is output on a side surface of an electronic device. However, embodiments of the present disclosure may not be limited thereto. For example, the second processor 220 may add a virtual button in an area that is out of an active area of a display.

Referring to FIG. 13, in the case where the display panel 150 includes a side touch area, the second processor 220 may output a power button, a volume button, or the like with a virtual button operating in a touch manner, not with a physical button.

The first processor 110 may transmit a front image 1350 to the first display driving integrated circuit 130. The front image 1350 may be compressed and stored in the image area 231 of the graphics memory 230.

As in the manner described with reference to FIG. 6, the second processor 220 may output an image area 1351 (e.g., an icon of a status bar, a digital clock, or the like) varying in the front image 1350 by changing or replacing a partial image.

The second processor 220 may output virtual buttons 1361 and 1371 or an image 1372 of side images 1360 and 1370 by using a partial image. In this case, the side images 1360 and 1370 may be output in a state where a background is set by using at least a part of the front image 1350 or may be output through a monochromatic screen (e.g., a monochromatic screen in which RGB is combined) without a separate background.

In various embodiments, the second processor 220 may determine a way to output the side images 1360 and 1370 in response to a control signal received from the first processor 110. For example, the second processor 220 may determine whether to output a partial image (e.g., a volume button, a power button, or the like) to be output in the side images 1360 and 1370, an arrangement location of the partial image, and the like in response to the control signal.

Figure 14:
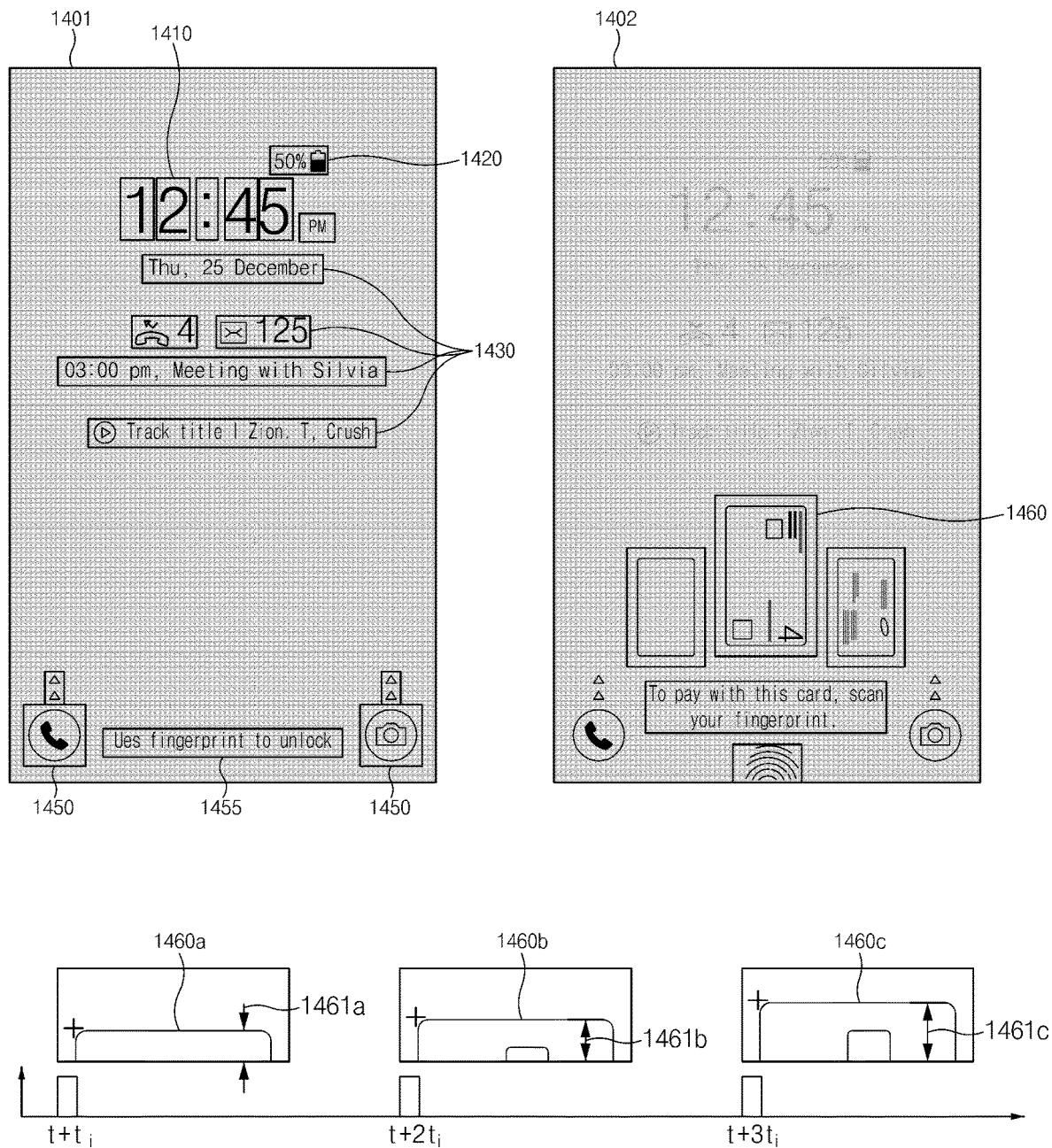
FIG. 14 is an exemplification diagram of a screen in which an always on display (AOD) is implemented according to an embodiment of the present disclosure.

FIG. 14 is an exemplification diagram of a screen in which an always on display (AOD) is implemented according to an embodiment of present disclosure.

Referring to FIG. 14, the display panel 150 may be output in an AOD manner. In this case, the display panel 150 may always display specified text, icon, and the like in a state where there is no separate user input.

In a first AOD screen 1401, at least some of output text, icons, and the like may be output through an update of a main image transmitted from the first processor 110, and the others may be output through a partial image generated in the second processor 220.

For example, an hour/minute 1410 of a digital clock, a battery icon 1420, app execution buttons 1450, a fingerprint area 1455, and the like may be output through a change of a partial image generated in the second processor 220. The second processor 220 may update the hour/minute 1410 of the digital clock, the battery icon 1420, and the like in response to a timing signal by an internal timer.

For another example, information 1430 of date information, a missed call, message reception, a schedule change, a music play list, and the like may be changed through an update of a main image transmitted from the first processor 110. In the case where the information is changed, the first processor 110 may change image data stored in the image area 231 of the graphics memory 230. The second processor 220 may combine the updated main image stored in the image area 231 and a partial image and may output the combined image through the second display driving integrated circuit 140.

The second processor 220 may output a second AOD screen 1402 if an input (e.g., a touch, hovering, pressure, or the like) of the user is made in a state where the first AOD screen 1401 is output. In various embodiments, the second AOD screen 1402 may be an additional screen composed of a text, an image, an icon, and the like that are changeable with a partial image processed by the second processor 220.

For example, if the user touches a fingerprint in the fingerprint area 1455 of a lower portion of the first AOD screen 1401 in a state where the first AOD screen 1401 is output, a fingerprint sensor may determine whether the fingerprint is valid and may transmit a control signal to the second processor 220. In the case where the fingerprint of the user is valid, the second processor 220 may output the second AOD screen including payment information 1460. A partial image associated with the payment information 1460 may be in advance stored in the resource area 232 of the graphics memory 230.

According to various embodiments, the second processor 220 may apply an image change effect or an animation effect in the process of outputting the second AOD screen 1402. For example, in the case where the fingerprint of the user is valid, the second processor 220 may output the payment information 1460a at a first height 1461a at a time of $(t+t_i)$ and may output the payment information 1460b at a second height 1461b at a time of $(t+2t_i)$. The second processor may output the payment information 1460c at a third height 1461c at a time of $(t+3t_i)$ (the first height<the second height<the third height). The second processor 220 may output a credit card image after cutting the credit card image to correspond to each height.

Figure 15:
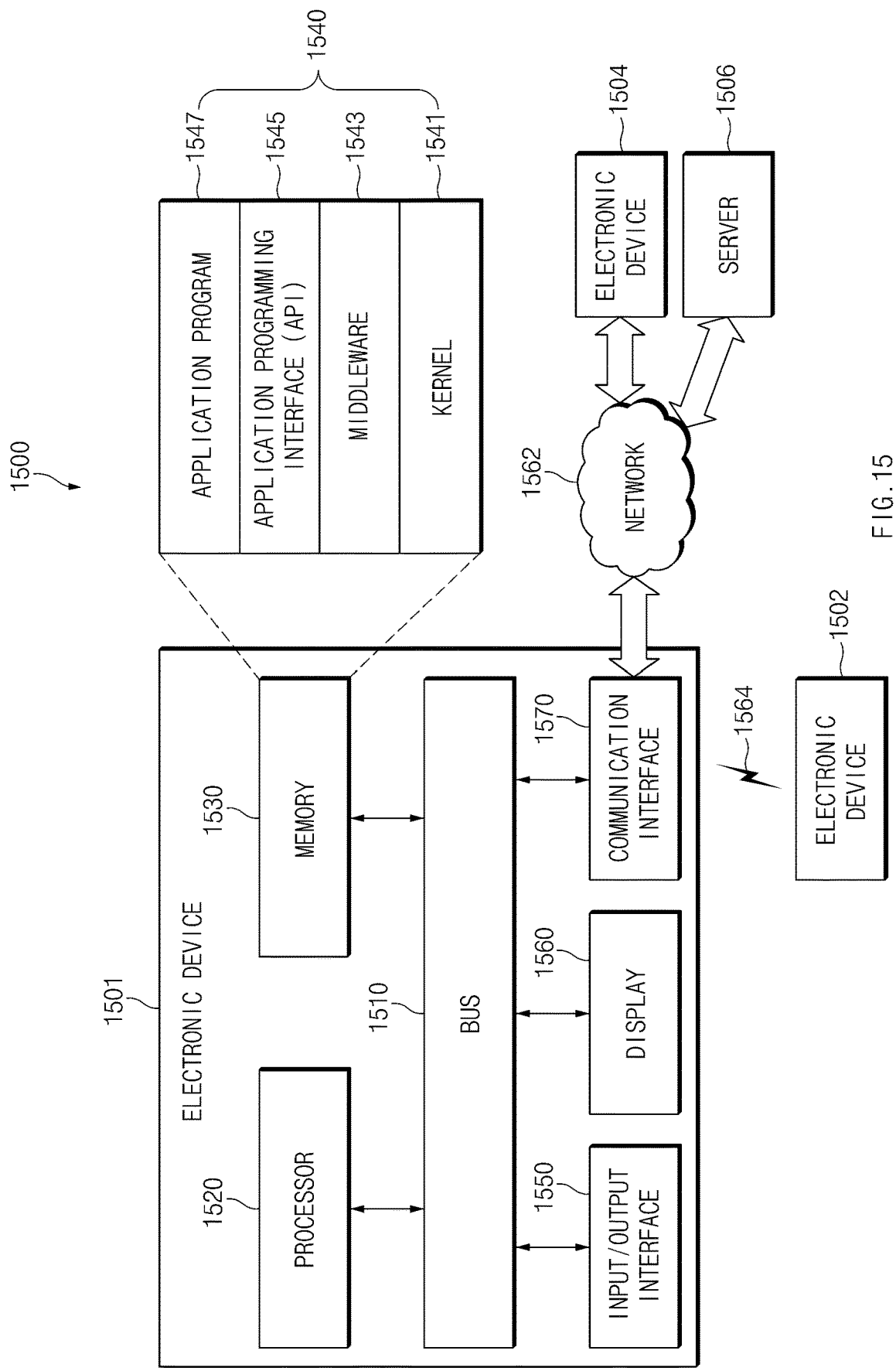
FIG. 15 illustrates the electronic device in a network environment according to an embodiment of the present disclosure.

FIG. 15 illustrates an electronic device in a network environment according to an embodiment of the present disclosure.

Referring to FIG. 15, an electronic device 1501 in a network environment 1500 according to various embodiments of the present disclosure will be described with reference to FIG. 15. The electronic device 1501 may include a bus 1510, a processor 1520, a memory 1530, an input/output interface 1550, a display 1560, and a communication interface 1570. In various embodiments of the present disclosure, at least one of the foregoing elements may be omitted or another element may be added to the electronic device 1501.

The bus 1510 may include a circuit for connecting the above-mentioned elements 1520, 1530, 1550, 1560, and 1570 to each other and transferring communications (e.g., control messages and/or data) among the above-mentioned elements.

The processor 1520 may include at least one of a CPU, an AP, or a CP. The processor 1520 may perform data processing or an operation related to communication and/or control of at least one of the other elements of the electronic device 1501.

The memory 1530 may include a volatile memory and/or a nonvolatile memory. The memory 1530 may store instructions or data related to at least one of the other elements of the electronic device 1501. According to an embodiment of the present disclosure, the memory 1530 may store software and/or a program 1540. The program 1540 may include, for example, a kernel 1541, a middleware 1543, an application programming interface (API) 1545, and/or an application program (or an application) 1547. At least a portion of the kernel 1541, the middleware 1543, or the API 1545 may be referred to as an operating system (OS).

The kernel 1541 may control or manage system resources (e.g., the bus 1510, the processor 1520, the memory 1530, or the like) used to perform operations or functions of other programs (e.g., the middleware 1543, the API 1545, or the application program 1547). Furthermore, the kernel 1541 may provide an interface for allowing the middleware 1543, the API 1545, or the application program 1547 to access individual elements of the electronic device 1501 in order to control or manage the system resources.

The middleware 1543 may serve as an intermediary so that the API 1545 or the application program 1547 communicates and exchanges data with the kernel 1541.

Furthermore, the middleware 1543 may handle one or more task requests received from the application program 1547 according to a priority order. For example, the middleware 1543 may assign at least one application program, e.g., the application program 1547 of FIG. 15, a priority for using the system resources (e.g., the bus 1510, the processor 1520, the memory 1530, or the like) of the electronic device 1501. For example, the middleware 1543 may handle the one or more task requests according to the priority assigned to the at least one application, thereby performing scheduling or load balancing with respect to the one or more task requests.

The API 1545, which is an interface for allowing the application program 1547 to control a function provided by the kernel 1541 or the middleware 1543, may include, for example, at least one interface or function (e.g., instructions) for file control, window control, image processing, character control, or the like.

The input/output interface 1550 may serve to transfer an instruction or data input from a user or another external device to (an)other element(s) of the electronic device 1501. Furthermore, the input/output interface 1550 may output instructions or data received from (an)other element(s) of the electronic device 1501 to the user or another external device.

The display 1560 may include, for example, an LCD, an LED display, an OLED display, a microelectromechanical systems (MEMS) display, or an electronic paper display. The display 1560 may present various content (e.g., a text, an image, a video, an icon, a symbol, or the like) to the user. The display 1560 may include a touch screen, and may receive a touch, gesture, proximity or hovering input from an electronic pen or a part of a body of the user.

The communication interface 1570 may set communications between the electronic device 1501 and an external device (e.g., a first external electronic device 1502, a second external electronic device 1504, or a server 1506). For example, the communication interface 1570 may be connected to a network 1562 via wireless communications or wired communications so as to communicate with the external device (e.g., the second external electronic device 1504 or the server 1506).

The wireless communications may employ at least one of cellular communication protocols such as long-term evolution (LTE), LTE-advance (LTE-A), code division multiple access (CDMA), wideband CDMA (WCDMA), universal mobile telecommunications system (UMTS), wireless broadband (WiBro), or global system for mobile communications (GSM). The wireless communications may include, for example, short-range communications 1564. The short-range communications may include at least one of Wi-Fi, Bluetooth, near field communication (NFC), magnetic stripe transmission (MST), or GNSS.

The MST may generate pulses according to transmission data and the pulses may generate electromagnetic signals. The electronic device 1501 may transmit the electromagnetic signals to a reader device such as a point of sales (POS) device. The POS device may detect the magnetic signals by using an MST reader and restore data by converting the detected electromagnetic signals into electrical signals.

The GNSS may include, for example, at least one of GPS, global navigation satellite system (GLONASS), BeiDou navigation satellite system (BeiDou), or Galileo, the European global satellite-based navigation system according to a use area or a bandwidth. Hereinafter, the term "GPS" and the term "GNSS" may be interchangeably used. The wired communications may include at least one of universal serial bus (USB), high definition multimedia interface (HDMI), recommended standard 832 (RS-232), plain old telephone service (POTS), or the like. The network 1562 may include at least one of telecommunications networks, for example, a computer network (e.g., local area network (LAN) or wide area network (WAN)), the Internet, or a telephone network.

The types of the first external electronic device 1502 and the second external electronic device 1504 may be the same as or different from the type of the electronic device 1501. According to an embodiment of the present disclosure, the server 1506 may include a group of one or more servers. A portion or all of operations performed in the electronic device 1501 may be performed in one or more other electronic devices (e.g., the first external electronic device 1502, the second external electronic device 1504, or the server 1506). When the electronic device 1501 should perform a certain function or service automatically or in response to a request, the electronic device 1501 may request at least a portion of functions related to the function or service from another device (e.g., the first external electronic device 1502, the second external electronic device 1504, or the server 1506) instead of or in addition to performing the function or service for itself. The other electronic device (e.g., the first external electronic device 1502, the second external electronic device 1504, or the server 1506) may perform the requested function or additional function, and may transfer a result of the performance to the electronic device 1501. The electronic device 1501 may use a received result itself or additionally process the received result to provide the requested function or service. To this end, for example, a cloud computing technology, a distributed computing technology, or a client-server computing technology may be used.

Figure 16:
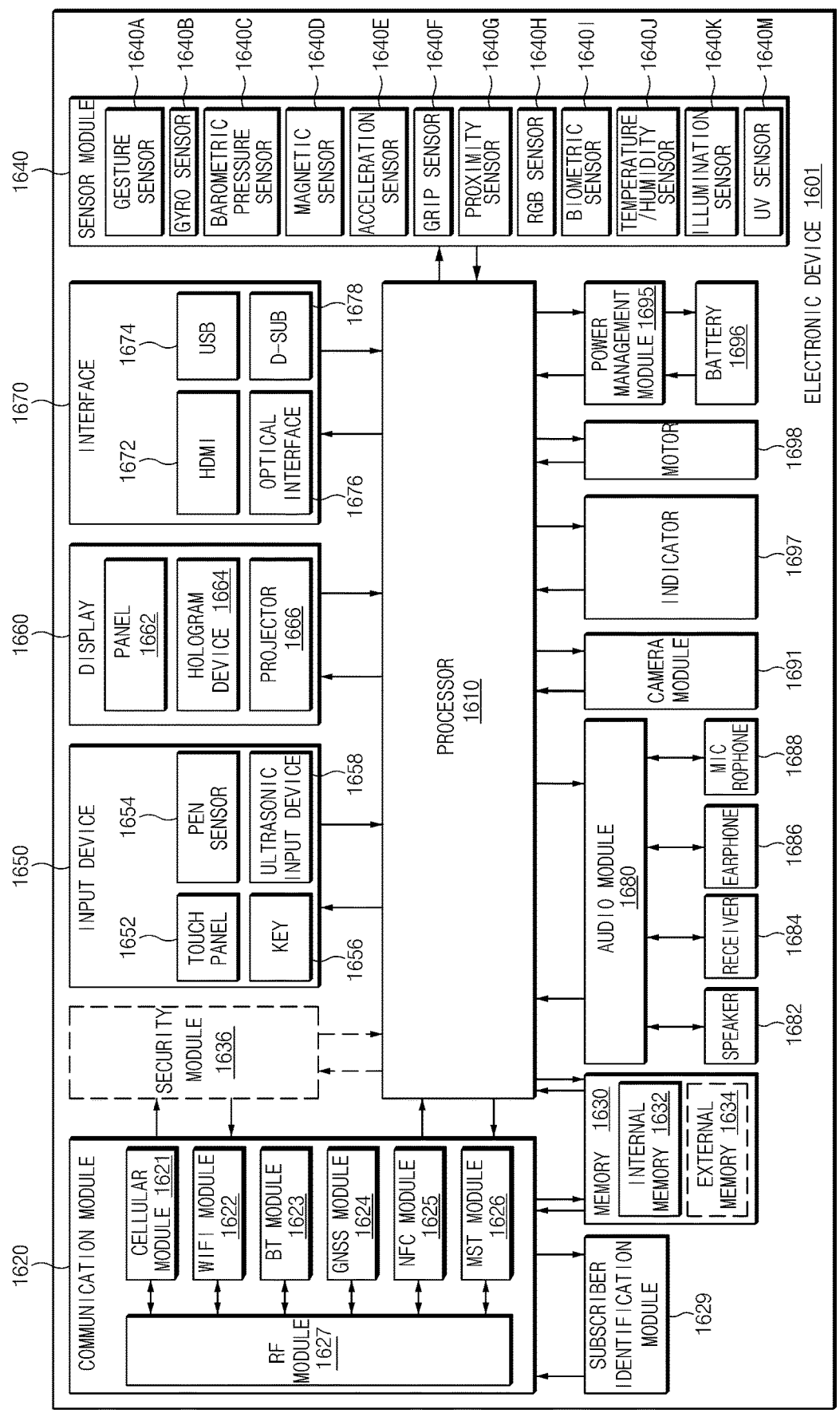
FIG. 16 illustrates a block diagram of the electronic device according to an embodiment of the present disclosure.

FIG. 16 is a block diagram illustrating a configuration of an electronic device according to an embodiment of the present disclosure.

Referring to FIG. 16, an electronic device 1601 may include, for example, all or part of the electronic device 1501 shown in FIG. 15. The electronic device 1601 may include one or more processors 1610 (e.g., APs), a communication module 1620, a subscriber identification module (SIM) 1629, a memory 1630, a security module 1636, a sensor module 1640, an input device 1650, a display 1660, an interface 1670, an audio module 1680, a camera module 1691, a power management module 1695, a battery 1696, an indicator 1697, and a motor 1698.

The processor 1610 may drive, for example, an OS or an application program to control a plurality of hardware or software components connected thereto and may process and compute a variety of data. The processor 1610 may be implemented with, for example, a system on chip (SoC). According to an embodiment of the present disclosure, the processor 1610 may include a graphic processing unit (GPU) (not shown) and/or an image signal processor (not shown). The processor 1610 may include at least some (e.g., a cellular module 1621) of the components shown in FIG. 16. The processor 1610 may load a command or data received from at least one of other components (e.g., a non-volatile memory) into a volatile memory to process the data and may store various data in a non-volatile memory.

The communication module 1620 may have the same or similar configuration as the communication interface 1570 of FIG. 15. The communication module 1620 may include, for example, the cellular module 1621, a Wi-Fi module 1622, a BT module 1623, a global navigation satellite system (GNSS) module 1624 (e.g., a GPS module, a Glonass module, a Beidou module, or a Galileo module), an NFC module 1625, an MST module 1626, and a radio frequency (RF) module 1627.

The cellular module 1621 may provide, for example, a voice call service, a video call service, a text message service, or an Internet service, and the like through a communication network. According to an embodiment of the present disclosure, the cellular module 1621 may identify and authenticate the electronic device 1601 in a communication network using the SIM 1629 (e.g., a SIM card). According to an embodiment of the present disclosure, the cellular module 1621 may perform at least part of functions which may be provided by the processor 1610. According to an embodiment of the present disclosure, the cellular module 1621 may include a CP.

The Wi-Fi module 1622, the BT module 1623, the GNSS module 1624, the NFC module 1625, or the MST module 1626 may include, for example, a processor for processing data transmitted and received through the corresponding module. According to various embodiments of the present disclosure, at least some (e.g., two or more) of the cellular module 1621, the Wi-Fi module 1622, the BT module 1623, the GNSS module 1624, the NFC module 1625, or the MST module 1626 may be included in one integrated chip (IC) or one IC package.

The RF module 1627 may transmit and receive, for example, a communication signal (e.g., an RF signal). Though not shown, the RF module 1627 may include, for example, a transceiver, a power amplifier module (PAM), a frequency filter, or a low noise amplifier (LNA), or an antenna, and the like. According to another embodiment of the present disclosure, at least one of the cellular module 1621, the Wi-Fi module 1622, the BT module 1623, the GNSS module 1624, the NFC module 1625, or the MST module 1626 may transmit and receive an RF signal through a separate RF module.

The SIM 1629 may include, for example, a card which includes a SIM and/or an embedded SIM. The SIM 1629 may include unique identification information (e.g., an integrated circuit card identifier (ICCID)) or subscriber information (e.g., an international mobile subscriber identity (IMSI)).

The memory 1630 (e.g., the memory 1530 of FIG. 15) may include, for example, an embedded internal memory 1632 or an external memory 1634. The embedded internal memory 1632 may include at least one of, for example, a volatile memory (e.g., a dynamic random access memory (DRAM), a static RAM (SRAM), a synchronous dynamic RAM (SDRAM), and the like), or a non-volatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory, and the like), a hard drive, or a solid state drive (SSD)).

The external memory 1634 may include a flash drive, for example, a compact flash (CF), a secure digital (SD), a micro-SD, a mini-SD, an extreme digital (xD), a multimedia car (MMC), or a memory stick, and the like. The external memory 1634 may operatively and/or physically connect with the electronic device 1601 through various interfaces.

The security module 1636 may be a module which has a relatively higher secure level than the memory 1630 and may be a circuit which stores secure data and guarantees a protected execution environment. The security module 1636 may be implemented with a separate circuit and may include a separate processor. The security module 1636 may include, for example, an embedded secure element (eSE) which is present in a removable smart chip or a removable SD card or is embedded in a fixed chip of the electronic device 1601. Also, the security module 1636 may be driven by an OS different from the OS of the electronic device 1601. For example, the security module 1636 may operate based on a java card open platform (JCOP) OS.

The sensor module 1640 may measure, for example, a physical quantity or may detect an operation state of the electronic device 1601, and may convert the measured or detected information to an electric signal. The sensor module 1640 may include at least one of, for example, a gesture sensor 1640A, a gyro sensor 1640B, a barometric pressure sensor 1640C, a magnetic sensor 1640D, an acceleration sensor 1640E, a grip sensor 1640F, a proximity sensor 1640G, a color sensor 1640H (e.g., red, green, blue (RGB) sensor), a biometric sensor 1640I, a temperature/humidity sensor 1640J, an illumination sensor 1640K, or an ultraviolet (UV) sensor 1640M. Additionally or alternatively, the sensor module 1640 may further include, for example, an e-nose sensor (not shown), an electromyography (EMG) sensor (not shown), an electroencephalogram (EEG) sensor (not shown), an electrocardiogram (ECG) sensor (not shown), an infrared (IR) sensor (not shown), an iris sensor (not shown), and/or a fingerprint sensor (not shown), and the like. The sensor module 1640 may further include a control circuit for controlling at least one or more sensors included therein. According to various embodiments of the present disclosure, the electronic device 1601 may further include a processor configured to control the sensor module 1640, as part of the processor 1610 or to be independent of the processor 1610. While the processor 1610 is in a sleep state, the electronic device 1601 may control the sensor module 1640.

The input device 1650 may include, for example, a touch panel 1652, a (digital) pen sensor 1654, a key 1656, or an ultrasonic input device 1658. The touch panel 1652 may use at least one of, for example, a capacitive type, a resistive type, an infrared type, or an ultrasonic type. Also, the touch panel 1652 may further include a control circuit. The touch panel 1652 may further include a tactile layer and may provide a tactile reaction to a user.

The (digital) pen sensor 1654 may be, for example, part of the touch panel 1652 or may include a separate sheet for recognition. The key 1656 may include, for example, a physical button, an optical key, or a keypad. The ultrasonic input device 1658 may allow the electronic device 1601 to detect a sound wave using a microphone (e.g., a microphone 1688) and to verify data through an input tool generating an ultrasonic signal.

The display 1660 (e.g., the display 1560 of FIG. 15) may include a panel 1662, a hologram device 1664, or a projector 1666. The panel 1662 may include the same or similar configuration as the display 1560. The panel 1662 may be implemented to be, for example, flexible, transparent, or wearable. The panel 1662 and the touch panel 1652 may be integrated into one module. The hologram device 1664 may show a stereoscopic image in a space using interference of light. The projector 1666 may project light onto a screen to display an image. The screen may be positioned, for example, inside or outside the electronic device 1601. According to an embodiment of the present disclosure, the display 1660 may further include a control circuit for controlling the panel 1662, the hologram device 1664, or the projector 1666.

The interface 1670 may include, for example, a high-definition multimedia interface (HDMI) 1672, a USB 1674, an optical interface 1676, or a D-subminiature 1678. The interface 1670 may be included in, for example, the communication interface 1570 shown in FIG. 15. Additionally or alternatively, the interface 1670 may include, for example, a mobile high definition link (MHL) interface, an SD card/ multimedia card (MMC) interface, or an infrared data association (IrDA) standard interface.

The audio module 1680 may convert a sound and an electric signal in dual directions. At least part of components of the audio module 1680 may be included in, for example, the input and output interface 1550 (or a user interface) shown in FIG. 15. The audio module 1680 may process sound information input or output through, for example, a speaker 1682, a receiver 1684, an earphone 1686, or the microphone 1688, and the like.

The camera module 1691 may be a device which captures a still image and a moving image. According to an embodiment of the present disclosure, the camera module 1691 may include one or more image sensors (not shown) (e.g., a front sensor or a rear sensor), a lens (not shown), an image signal processor (ISP) (not shown), or a flash (not shown) (e.g., an LED or a xenon lamp).

The power management module 1695 may manage, for example, power of the electronic device 1601. According to an embodiment of the present disclosure, though not shown, the power management module 1695 may include a PMIC, a charger IC or a battery or fuel gauge. The PMIC may have a wired charging method and/or a wireless charging method. The wireless charging method may include, for example, a magnetic resonance method, a magnetic induction method, or an electromagnetic method, and the like. An additional circuit for wireless charging, for example, a coil loop, a resonance circuit, or a rectifier, and the like may be further provided. The battery gauge may measure, for example, the remaining capacity of the battery 1696 and voltage, current, or temperature thereof while the battery 1696 is charged. The battery 1696 may include, for example, a rechargeable battery or a solar battery.

The indicator 1697 may display a specific state of the electronic device 1601 or part (e.g., the processor 1610) thereof, for example, a booting state, a message state, or a charging state, and the like. The motor 1698 may convert an electric signal into mechanical vibration and may generate vibration or a haptic effect, and the like. Though not shown, the electronic device 1601 may include a processing unit (e.g., a GPU) for supporting a mobile TV. The processing unit for supporting the mobile TV may process media data according to standards, for example, a digital multimedia broadcasting (DMB) standard, a digital video broadcasting (DVB) standard, or a MediaFLO™ standard, and the like.

Each of the above-mentioned elements of the electronic device according to various embodiments of the present disclosure may be configured with one or more components, and names of the corresponding elements may be changed according to the type of the electronic device. The electronic device according to various embodiments of the present disclosure may include at least one of the above-mentioned elements, some elements may be omitted from the electronic device, or other additional elements may be further included in the electronic device. Also, some of the elements of the electronic device according to various embodiments of the present disclosure may be combined with each other to form one entity, thereby making it possible to perform the functions of the corresponding elements in the same manner as before the combination.

According to various embodiments, an electronic device includes a display panel including a plurality of pixels, a first processor configured to execute an application, a first display driving integrated circuit including a second processor and a graphics memory, and a second display driving integrated circuit including a source driver configured to control at least some of the plurality of pixels. The second processor may be configured to, when the first processor is in an inactive state with respect to the first display driving integrated circuit, compose or post-process another image to be displayed through the display panel based at least on at least one image stored in the graphics memory, by using the first display driving integrated circuit, and transmit the other image to the second display driving integrated circuit such that the other image is displayed through the display panel.

According to various embodiments, the first display driving integrated circuit does not include a separate source driver.

According to various embodiments, the first display driving integrated circuit and the second display driving integrated circuit are designed with one display driving integrated circuit chip.

According to various embodiments, the first display driving integrated circuit is designed with a first display driving integrated circuit chip, and the second display driving integrated circuit is designed with a second display driving integrated circuit chip.

According to various embodiments, the first display driving integrated circuit is formed to be adjacent to one surface of the display panel.

According to various embodiments, the first display driving integrated circuit further includes an image processor configured to change image data received from the first processor and a magnifier configured to adjust an arrangement size of the other image.

According to various embodiments, the second display driving integrated circuit further includes a gate driver and a timing controller configured to generate a source control signal for controlling an operation timing of the source driver and a gate control signal for controlling an operation timing of the gate driver.

According to various embodiments, the second processor is configured to operate at a specified power value or less.

According to various embodiments, the second processor is configured to establish a separate channel with at least one of a CP, a touch control circuit, a touch pen control circuit, a sensor hub, or a GPS control module, sense an occurrence of a specified event received through the channel, and generate the other image based at least on the specified event.

According to various embodiments, the second processor is configured to receive brightness information of a periphery of the electronic device through the separate channel connected with the sensor hub and generate the other image based on the brightness information.

According to various embodiments, the second processor is configured to receive coordinate information of a touch pen through the separate channel connected with the touch pen control circuit and generate the other image based on the coordinate information.

According to various embodiments, the second processor is configured to update the other image in response to an internal periodic timing signal of the second processor.

According to various embodiments, the graphics memory includes a first area configured to store a main image transmitted from the first processor and a second area configured to store a partial image for composing the other image.

According to various embodiments, the first area is configured to store the main image compressed in a specified manner.

According to various embodiments, the second area is configured to store the partial image as having a specified capacity or less.

According to various embodiments, the second area is initialized or updated based on an image transmitted by the first processor.

According to various embodiments, the second processor is configured to output an icon or text of a status bar, which is to be output through the display panel, by using the other image.

According to various embodiments, the second processor is configured to output at least a part of a lock view, a view cover screen, or an always on screen through the display panel by using the other image.

According to various embodiments, the second processor is configured to output an animation effect by using the other image in response to an internal periodic timing signal of the second processor.

According to various embodiments, the second processor is configured to output the animation effect by stepwise changing transparency or a background color of one image.

According to various embodiments, the second processor is configured to, in a state where a first screen obtained by combining main image data transmitted from the first processor and partial image data for composing the other image is output, output a second screen composed of the partial image data based on a specified user input.

Figure 17:
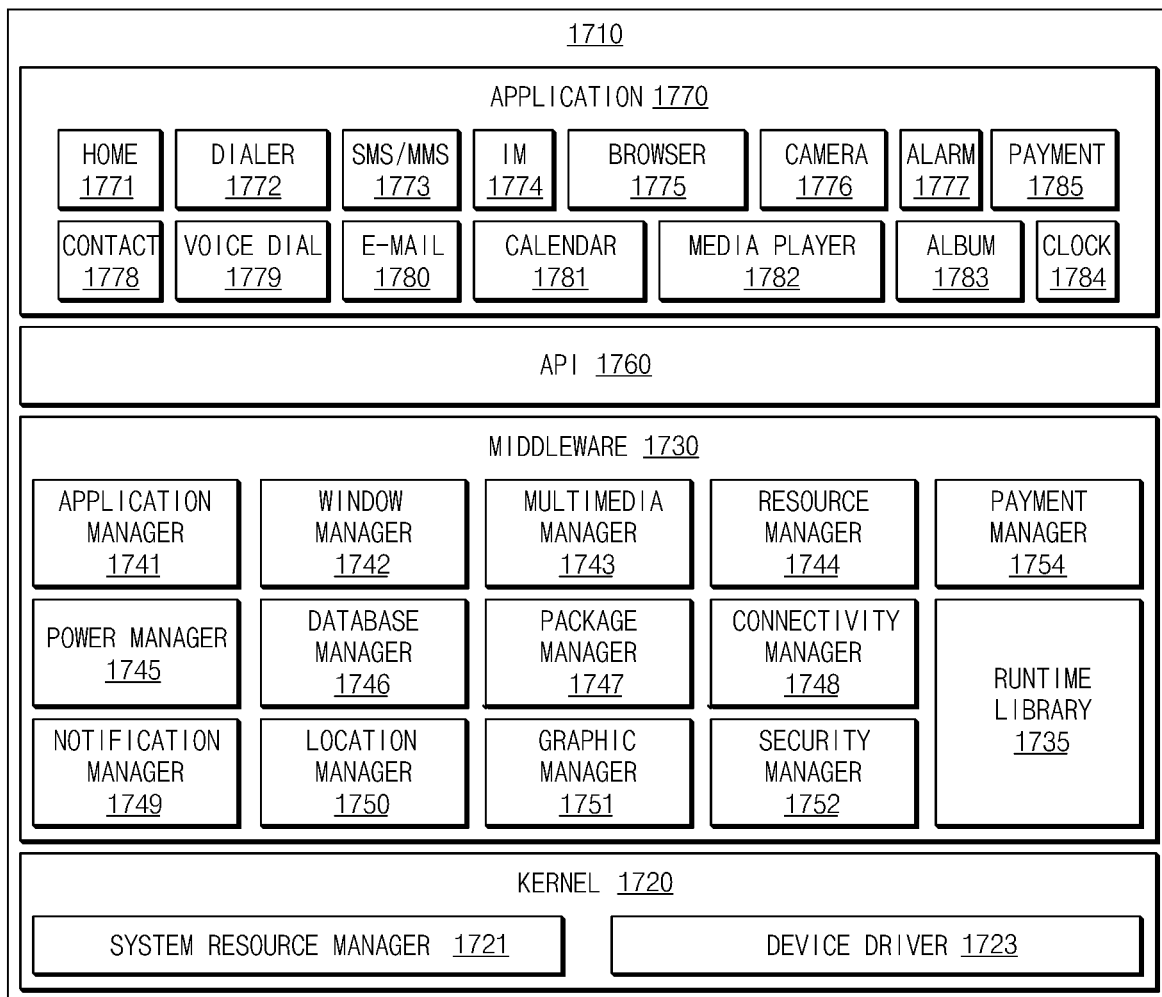
FIG. 17 illustrates a block diagram illustrating a configuration of a program module according to an embodiment of the present disclosure.

FIG. 17 is a block diagram illustrating a configuration of a program module 1710 according to an embodiment of the present disclosure.

Referring to FIG. 17, according to an embodiment of the present disclosure, the program module 1710 (e.g., the program 1540 of FIG. 15) may include an OS for controlling resources associated with an electronic device (e.g., the electronic device 1501 of FIG. 15) and/or various applications (e.g., the application program 1547 of FIG. 15) which are executed on the OS. The OS may be, for example, Android, iOS, Windows, Symbian, Tizen, or Bada, and the like.

The program module 1710 may include a kernel 1720, a middleware 1730, an API 1760, and/or an application 1770. At least part of the program module 1710 may be preloaded on the electronic device, or may be downloaded from an external electronic device (e.g., the first external electronic device 1502, the second external electronic device 1504, or the server 1506, and the like of FIG. 15).

The kernel 1720 (e.g., a kernel 1541 of FIG. 15) may include, for example, a system resource manager 1721 and/or a device driver 1723. The system resource manager 1721 may control, assign, or collect, and the like system resources. According to an embodiment of the present disclosure, the system resource manager 1721 may include a process management unit, a memory management unit, or a file system management unit, and the like. The device driver 1723 may include, for example, a display driver, a camera driver, a Bluetooth (BT) driver, a shared memory driver, a USB driver, a keypad driver, a Wi-Fi driver, an audio driver, or an inter-process communication (IPC) driver.

The middleware 1730 (e.g., the middleware 1543 of FIG. 15) may provide, for example, functions the application 1770 needs in common, and may provide various functions to the application 1770 through the API 1760 such that the application 1770 efficiently uses limited system resources in the electronic device. According to an embodiment of the present disclosure, the middleware 1730 (e.g., the middleware 1543) may include at least one of a runtime library 1735, an application manager 1741, a window manager 1742, a multimedia manager 1743, a resource manager 1744, a power manager 1745, a database manager 1746, a package manager 1747, a connectivity manager 1748, a notification manager 1749, a location manager 1750, a graphic manager 1751, a security manager 1752, or a payment manager 1754.

The runtime library 1735 may include, for example, a library module used by a compiler to add a new function through a programming language while the application 1770 is executed. The runtime library 1735 may perform a function about input and output management, memory management, or an arithmetic function.

The application manager 1741 may manage, for example, a life cycle of at least one of the application 1770. The window manager 1742 may manage graphic user interface (GUI) resources used on a screen of the electronic device. The multimedia manager 1743 may determine a format utilized for reproducing various media files and may encode or decode a media file using a codec corresponding to the corresponding format. The resource manager 1744 may manage source codes of at least one of the application 1770, and may manage resources of a memory or a storage space, and the like.

The power manager 1745 may act together with, for example, a basic input/output system (BIOS) and the like, may manage a battery or a power source, and may provide power information utilized for an operation of the electronic device. The database manager 1746 may generate, search, or change a database to be used in at least one of the application 1770. The package manager 1747 may manage installation or update of an application distributed by a type of a package file.

The connectivity manager 1748 may manage, for example, wireless connection such as Wi-Fi connection or BT connection, and the like. The notification manager 1749 may display or notify events, such as an arrival message, an appointment, and proximity notification, by a method which is not disturbed to the user. The location manager 1750 may manage location information of the electronic device. The graphic manager 1751 may manage a graphic effect to be provided to the user or a user interface (UI) related to the graphic effect. The security manager 1752 may provide all security functions utilized for system security or user authentication, and the like. According to an embodiment of the present disclosure, when the electronic device (e.g., the electronic device 1501 of FIG. 15) has a phone function, the middleware 1730 may further include a telephony manager (not shown) for managing a voice or video communication function of the electronic device.

The middleware 1730 may include a middleware module which configures combinations of various functions of the above-described components. The middleware 1730 may provide a module which specializes according to types of OSs to provide a differentiated function. Also, the middleware 1730 may dynamically delete some of old components or may add new components.

The API 1760 (e.g., the API 1545 of FIG. 15) may be, for example, a set of API programming functions, and may be provided with different components according to OSs. For example, in case of Android or iOS, one API set may be provided according to platforms. In case of Tizen, two or more API sets may be provided according to platforms.

The application 1770 (e.g., the application program 1547 of FIG. 15) may include one or more of, for example, a home application 1771, a dialer application 1772, a short message service/multimedia message service (SMS/MMS) application 1773, an instant message (IM) application 1774, a browser application 1775, a camera application 1776, an alarm application 1777, a contact application 1778, a voice dial application 1779, an e-mail application 1780, a calendar application 1781, a media player application 1782, an album application 1783, a clock application 1784, a payment application 1785, a health care application (e.g., an application for measuring quantity of exercise or blood sugar, and the like), or an environment information application (e.g., an application for providing atmospheric pressure information, humidity information, or temperature information, and the like), and the like.

According to an embodiment of the present disclosure, the application 1770 may include an application (hereinafter, for better understanding and ease of description, referred to as "information exchange application") for exchanging information between the electronic device (e.g., the electronic device 1501 of FIG. 15) and an external electronic device (e.g., the first external electronic device 1502 or the second external electronic device 1504). The information exchange application may include, for example, a notification relay application for transmitting specific information to the external electronic device or a device management application for managing the external electronic device.

For example, the notification relay application may include a function of transmitting notification information, which is generated by other applications (e.g., the SMS/MMS application, the e-mail application, the health care application, or the environment information application, and the like) of the electronic device, to the external electronic device (e.g., the first external electronic device 1502 or the second external electronic device 1504). Also, the notification relay application may receive, for example, notification information from the external electronic device, and may provide the received notification information to the user of the electronic device.

The device management application may manage (e.g., install, delete, or update), for example, at least one (e.g., a function of turning on/off the external electronic device itself (or partial components) or a function of adjusting brightness (or resolution) of a display) of functions of the external electronic device (e.g., the first external electronic device 1502 or the second external electronic device 1504) which communicates with the electronic device, an application which operates in the external electronic device, or a service (e.g., a call service or a message service) provided from the external electronic device.

According to an embodiment of the present disclosure, the application 1770 may include an application (e.g., the health card application of a mobile medical device) which is preset according to attributes of the external electronic device (e.g., the first external electronic device 1502 or the second external electronic device 1504). According to an embodiment of the present disclosure, the application 1770 may include an application received from the external electronic device (e.g., the server 1506, the first external electronic device 1502, or the second external electronic device 1504). According to an embodiment of the present disclosure, the application 1770 may include a preloaded application or a third party application which may be downloaded from a server. Names of the components of the program module 1710 according to various embodiments of the present disclosure may differ according to kinds of OSs.

According to various embodiments of the present disclosure, at least part of the program module 1710 may be implemented with software, firmware, hardware, or at least two or more combinations thereof. At least part of the program module 1710 may be implemented (e.g., executed) by, for example, a processor (e.g., the processor 1610). At least part of the program module 1710 may include, for example, a module, a program, a routine, sets of instructions, or a process, and the like for performing one or more functions.

The term "module" used herein may represent, for example, a unit including one of hardware, software and firmware or a combination thereof. The term "module" may be interchangeably used with the terms "unit," "logic," "logical block," "component," and "circuit." The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific integrated circuit (ASIC) chip, a field-programmable gate array (FPGA), and a programmable-logic device for performing some operations, which are known or will be developed.

At least a part of devices (e.g., modules or functions thereof) or methods (e.g., operations) according to various embodiments of the present disclosure may be implemented as instructions stored in a computer-readable storage medium in the form of a program module. In the case where the instructions are performed by a processor (e.g., the processor 1520), the processor may perform functions corresponding to the instructions. The computer-readable storage medium may be, for example, the memory 1530.

A computer-readable recording medium may include a hard disk, a floppy disk, a magnetic medium (e.g., a magnetic tape), an optical medium (e.g., compact disc-ROM (CD-ROM), DVD), a magneto-optical medium (e.g., a floptical disk), or a hardware device (e.g., a ROM, a RAM, a flash memory, or the like). The program instructions may include machine language codes generated by compilers and high-level language codes that can be executed by computers using interpreters. The above-mentioned hardware device may be configured to be operated as one or more software modules for performing operations of various embodiments of the present disclosure and vice versa.

A module or a program module according to various embodiments of the present disclosure may include at least one of the above-mentioned elements, or some elements may be omitted or other additional elements may be added. Operations performed by the module, the program module or other elements according to various embodiments of the present disclosure may be performed in a sequential, parallel, iterative or heuristic way. Furthermore, some operations may be performed in another order or may be omitted, or other operations may be added.

According to various embodiments of the present disclosure, a display driving integrated circuit and an electronic device may generate and output a partial image for providing additional information to a user, through an operation of a display driving integrated circuit including a separate processor.

According to various embodiments of the present disclosure, the display driving integrated circuit and the electronic device may reduce the number of times that an AP is driven, through the operation of the display driving integrated circuit and may provide a fast response speed.

According to various embodiments of the present disclosure, the display driving integrated circuit and the electronic device may implement low-power home screen, lock screen, AOD, and the like, through the operation of the display driving integrated circuit.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
a display panel including a plurality of pixels;
a random access memory (RAM);
an application processor (AP) connected with the RAM and configured to execute an application;
a first chip including a first display driving integrated circuit, wherein the first display driving integrated circuit includes a microcontroller unit (MCU) and a graphics memory; and
a second chip including a second display driving integrated circuit, wherein the second chip is connected to the display panel,
wherein the first chip is configured to receive first image data from the AP and output second image data to the second chip,
wherein the second display driving integrated circuit includes source drivers, gate drivers, and a timing controller configured to drive the plurality of pixels according to the second image data output by the first chip, wherein the timing controller is further configured to generate a source control signal for controlling an operation timing of the source drivers and a gate control signal for controlling an operation timing of the gate drivers, and
wherein the MCU is configured to:
when the AP is in a sleep state, compose the first image data with at least one image stored in the graphics memory based on a control signal received from the AP or post-process the first image data, to generate the second image data, and
output the second image data to the second chip.

2. The electronic device of claim 1, wherein the first display driving integrated circuit is formed to be adjacent to one surface of the display panel.

3. The electronic device of claim 1, wherein the first display driving integrated circuit further includes:
an image processor configured to change image data received from the first processor; and
a magnifier configured to adjust an arrangement size of the second image data.

4. The electronic device of claim 1, wherein the MCU is further configured to operate at a specified power value or less.

5. The electronic device of claim 1, wherein the MCU is further configured to:
establish a separate channel with at least one of a communication processor (CP), a touch control circuit, a touch pen control circuit, a sensor hub, or a global positioning system (GPS) control module;
sense an occurrence of a specified event received through the channel; and
generate the second image data including the at least one image stored in the graphics memory based at least on the specified event.

6. The electronic device of claim 5, wherein the MCU is further configured to:
receive brightness information of a periphery of the electronic device through the separate channel connected with the sensor hub; and
generate the second image data based on the brightness information.

7. The electronic device of claim 5, wherein the MCU is further configured to:
receive coordinate information of a touch pen through the separate channel connected with the touch pen control circuit; and
generate the second image data based on the coordinate information.

8. The electronic device of claim 1, wherein the MCU is further configured to, in response to an internal periodic timing signal of the MCU, update the second image data to include the at least one image stored in the graphics memory.

9. The electronic device of claim 1, wherein the graphics memory includes:
a first area configured to store the first image data transmitted from the AP; and
a second area configured to store a partial image for composing the second image data.

10. The electronic device of claim 9, wherein the second area is further configured to store the partial image as having a specified capacity or less.

11. The electronic device of claim 9, wherein the second area is initialized or updated based on an image transmitted by the AP.

12. The electronic device of claim 1, wherein the MCU is further configured to output the second image data including an icon or text of a status bar, which is to be output through the display panel.

13. The electronic device of claim 1, wherein the MCU is further configured to output the second image data including at least a part of a lock view, a view cover screen, or an always on screen through the display panel.

14. The electronic device of claim 1, wherein the MCU is further configured to, in response to an internal periodic timing signal of the MCU, output the second image data including an animation effect.

15. The electronic device of claim 14, wherein the MCU is further configured to output the second image data including the animation effect by stepwise changing transparency or a background color of one image.

16. The electronic device of claim 1, wherein the MCU is further configured to, in a state where a first screen obtained by combining main image data transmitted from the AP and partial image data for composing the second image data is output, output a second screen composed of the partial image data based on a specified user input.

17. The electronic device of claim 1, wherein the first display driving integrated circuit does not include a separate source driver.

* * * * *